(12) United States Patent
Shiratsuchi et al.

(10) Patent No.: US 7,671,691 B2
(45) Date of Patent: Mar. 2, 2010

(54) QUADRATURE MODULATOR WITH PHASE CONTROLLER APPARATUS AND ERROR DETECTOR

(75) Inventors: Satoru Shiratsuchi, Atsugi (JP);
Kazuhiro Fujinuma, Ebina (JP);
Kazuhiko Yamaguchi, Isehara (JP)

(73) Assignee: Anritsu Corporation, Atsugi-Shi (JP)

( * ) Notice: Subject to any disclaimer, the term of this patent is extended or adjusted under 35 U.S.C. 154(b) by 447 days.

(21) Appl. No.: 11/791,801

(22) PCT Filed: Feb. 1, 2007

(86) PCT No.: PCT/JP2007/051714

§ 371 (c)(1),
(2), (4) Date: May 29, 2007

(87) PCT Pub. No.: WO2007/088938

PCT Pub. Date: Aug. 9, 2007

(65) Prior Publication Data
US 2009/0140787 A1      Jun. 4, 2009

(30) Foreign Application Priority Data
Feb. 3, 2006   (JP) ............................... 2006-026855

(51) Int. Cl.
*H03C 3/00* (2006.01)

(52) U.S. Cl. ...................... 332/103; 332/107; 455/63.1; 455/127.1; 455/127.2; 455/127.3; 375/296; 375/297

(58) Field of Classification Search ................. 332/107, 332/103; 455/127.1, 127.2, 127.3, 63.1; 375/296, 297

See application file for complete search history.

(56) References Cited

U.S. PATENT DOCUMENTS 6,930,563 B2 * 8/2005 Gumm ........................ 332/107
7,242,728 B2   7/2007 Kanazawa

FOREIGN PATENT DOCUMENTS

JP   11-163608 A    6/1999
JP    3737819 B2   11/2005

OTHER PUBLICATIONS

International Preliminary Report on Patentability, Chapter I of the Patent Cooperation Treaty, and Written Opinion for PCT/JP2007/051714 dated Aug. 14, 2008. 5 sheets.

* cited by examiner

*Primary Examiner*—Arnold Kinkead
(74) *Attorney, Agent, or Firm*—Frishauf, Holtz, Goodman & Chick, P.C.

(57) ABSTRACT

A quadrature modulator divides a first signal input as a local signal into an I channel signal and a Q channel signal orthogonal to each other and outputs a second signal having a desired phase delay corresponding to direct current voltages as for the first signal by giving the direct current voltages Vi and Vq to the I channel signal and the Q channel signal, respectively. A phase comparison unit detects a phase difference θ between the first signal and the second signal. A setting unit sets the desired phase delay. A controller section controls the direct current voltages supplied to the I channel signal and the Q channel signal respectively in the quadrature modulator so that an output value corresponding to the phase difference θ detected by the phase comparison unit is equal to a value corresponding to the desired phase delay set by the setting unit, and controls the direct current voltages to be the direct current voltages Vi and Vq satisfying the relation of Vi=cos θ and Vq=sin θ.

42 Claims, 18 Drawing Sheets

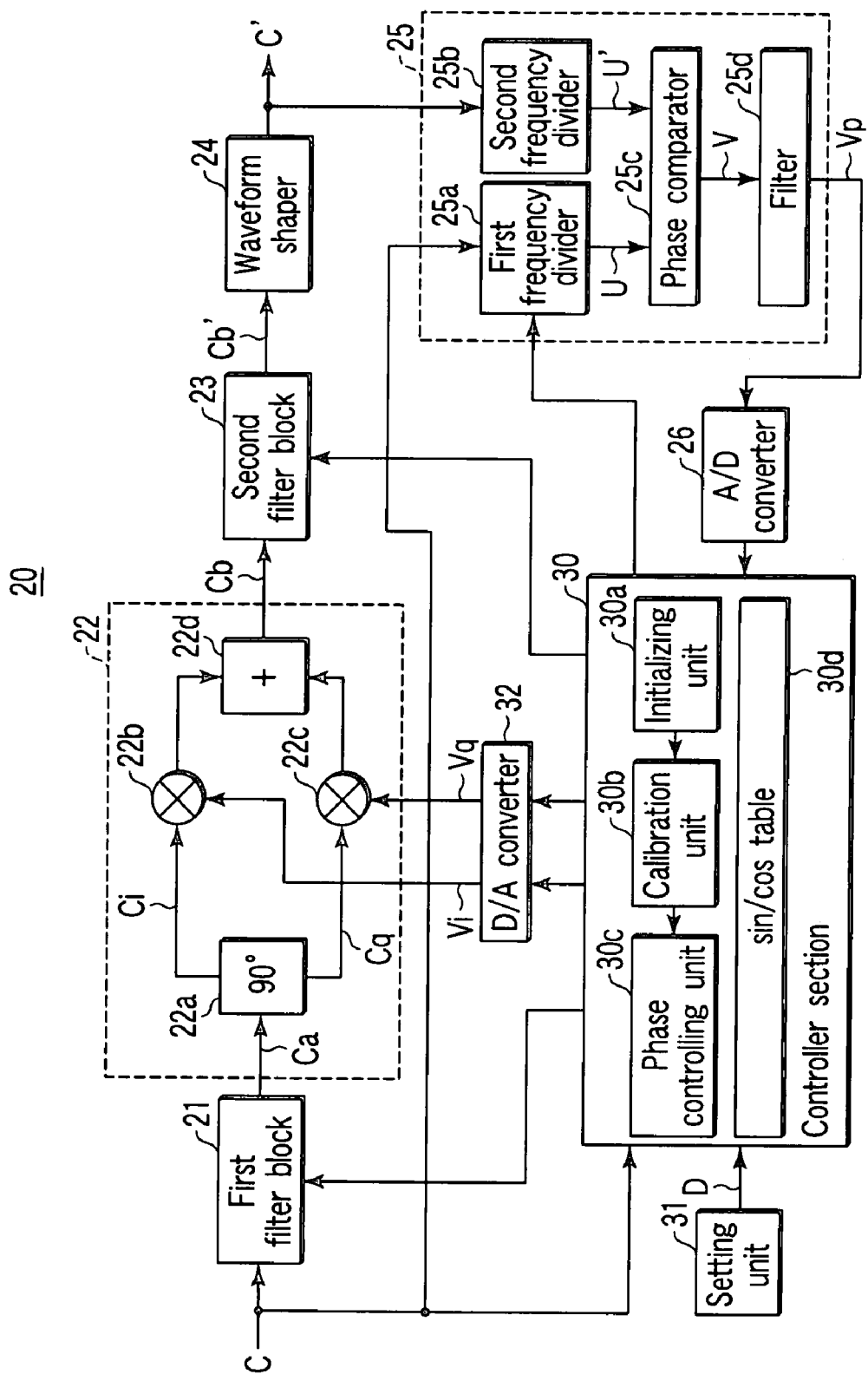
F I G. 1A

| Phase set value D[UI] | Vq=sinθ | Vi=cosθ |
|---|---|---|
| 0.000000 | 0.000000 | 1.000000 |
| 0.000200 | 0.001257 | 0.999999 |
| 0.000400 | 0.002513 | 0.999997 |
| ⋮ | ⋮ | ⋮ |
| 0.250000 | 1.000000 | 0.000000 |
| ⋮ | ⋮ | ⋮ |
| 0.999600 | -0.002513 | 0.999997 |
| 0.999800 | -0.001257 | 0.999999 |
| 1.000000 | 0.000000 | 1.000000 |

(rows labeled 0, π, 2π on left)

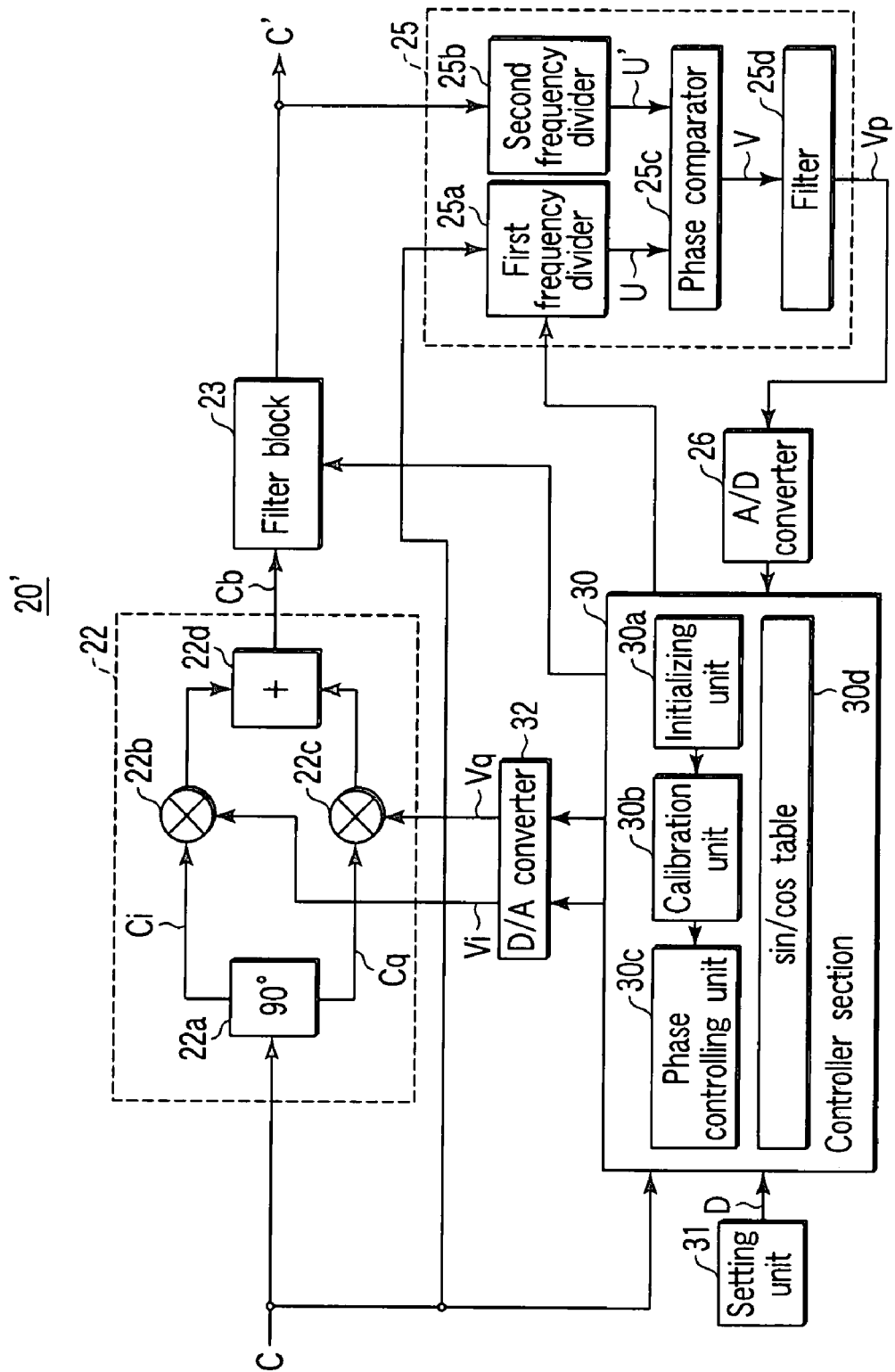
F I G. 10A

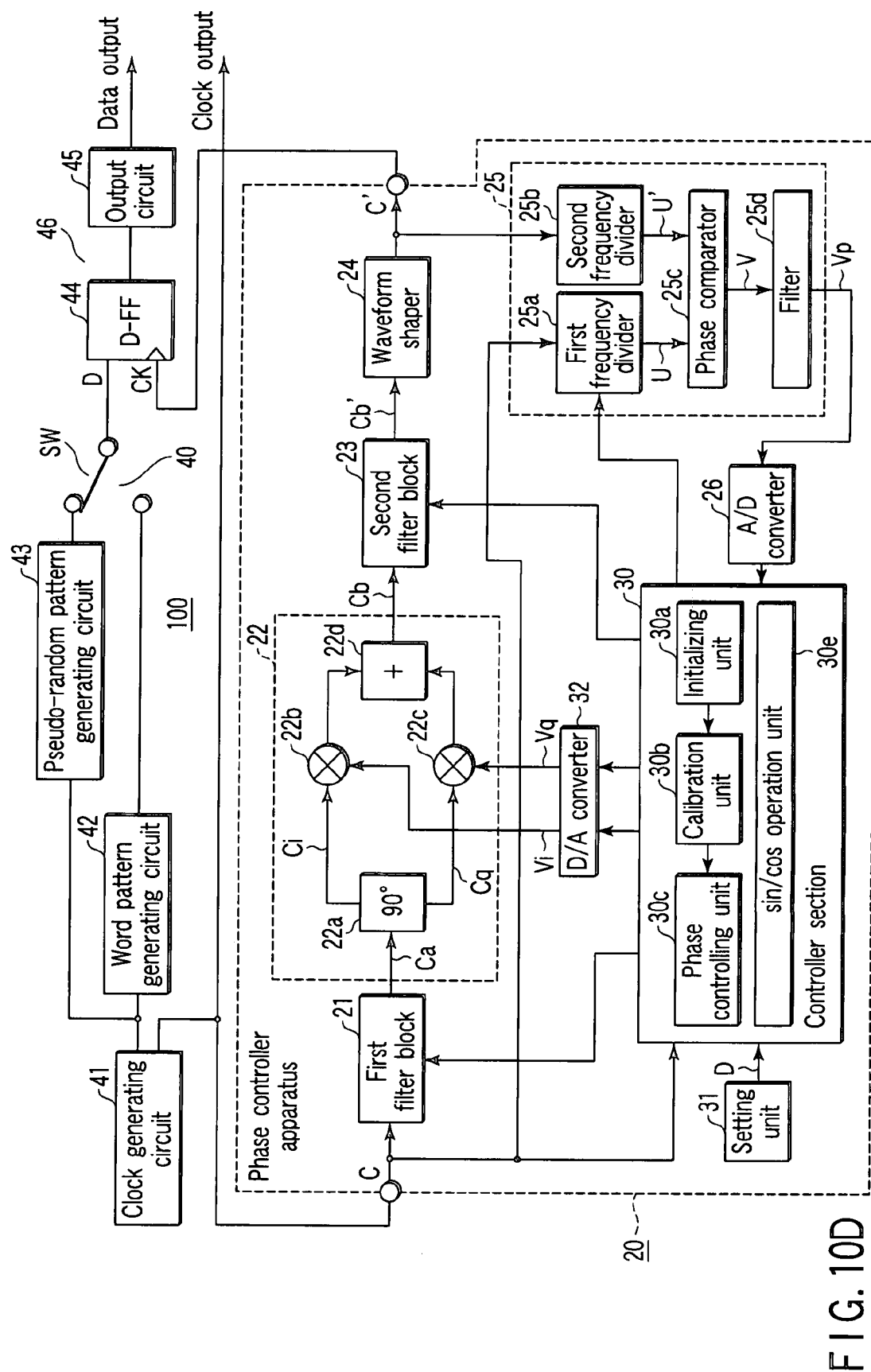
F I G. 10D

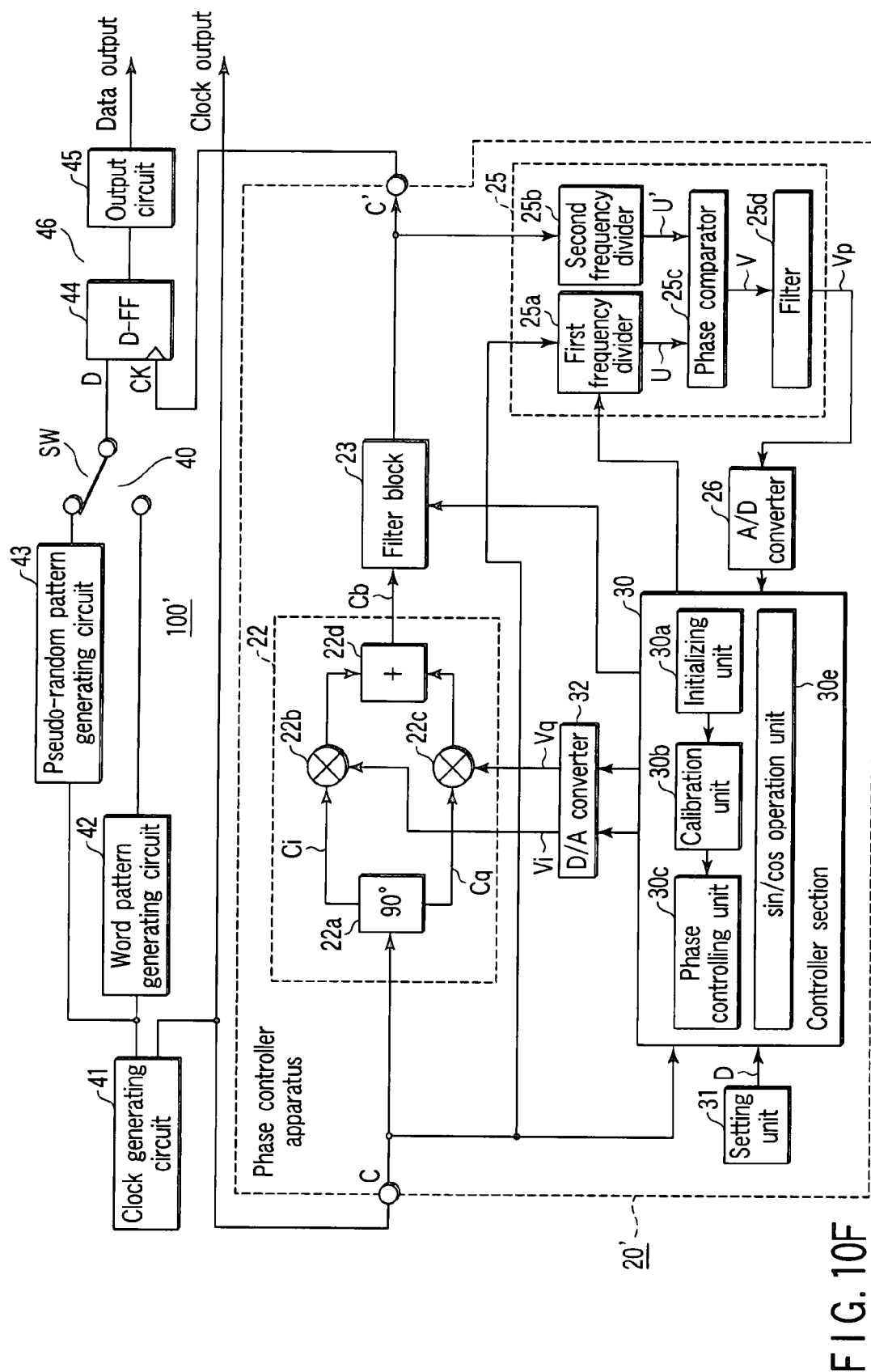
F I G. 10F

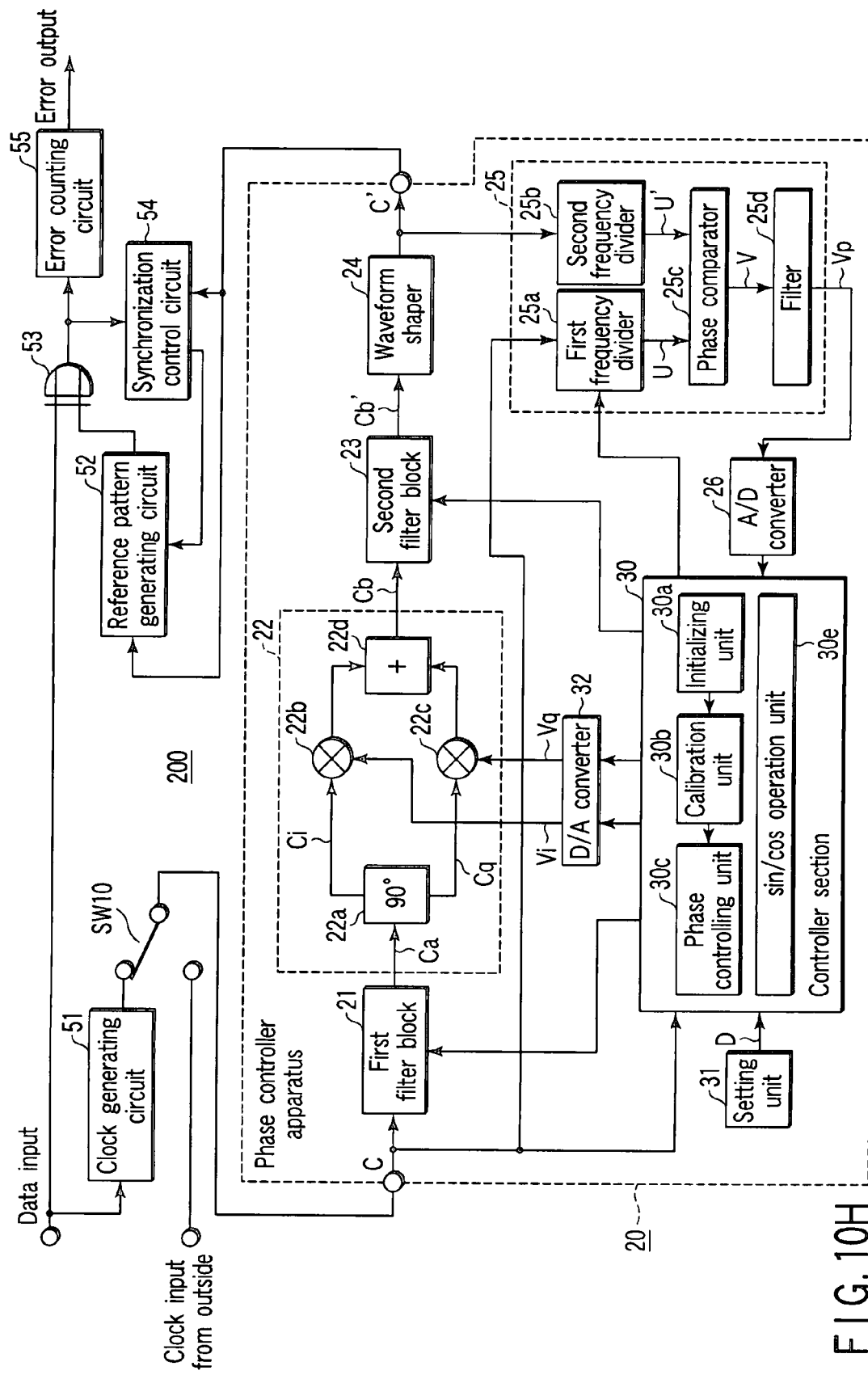
F I G. 10H

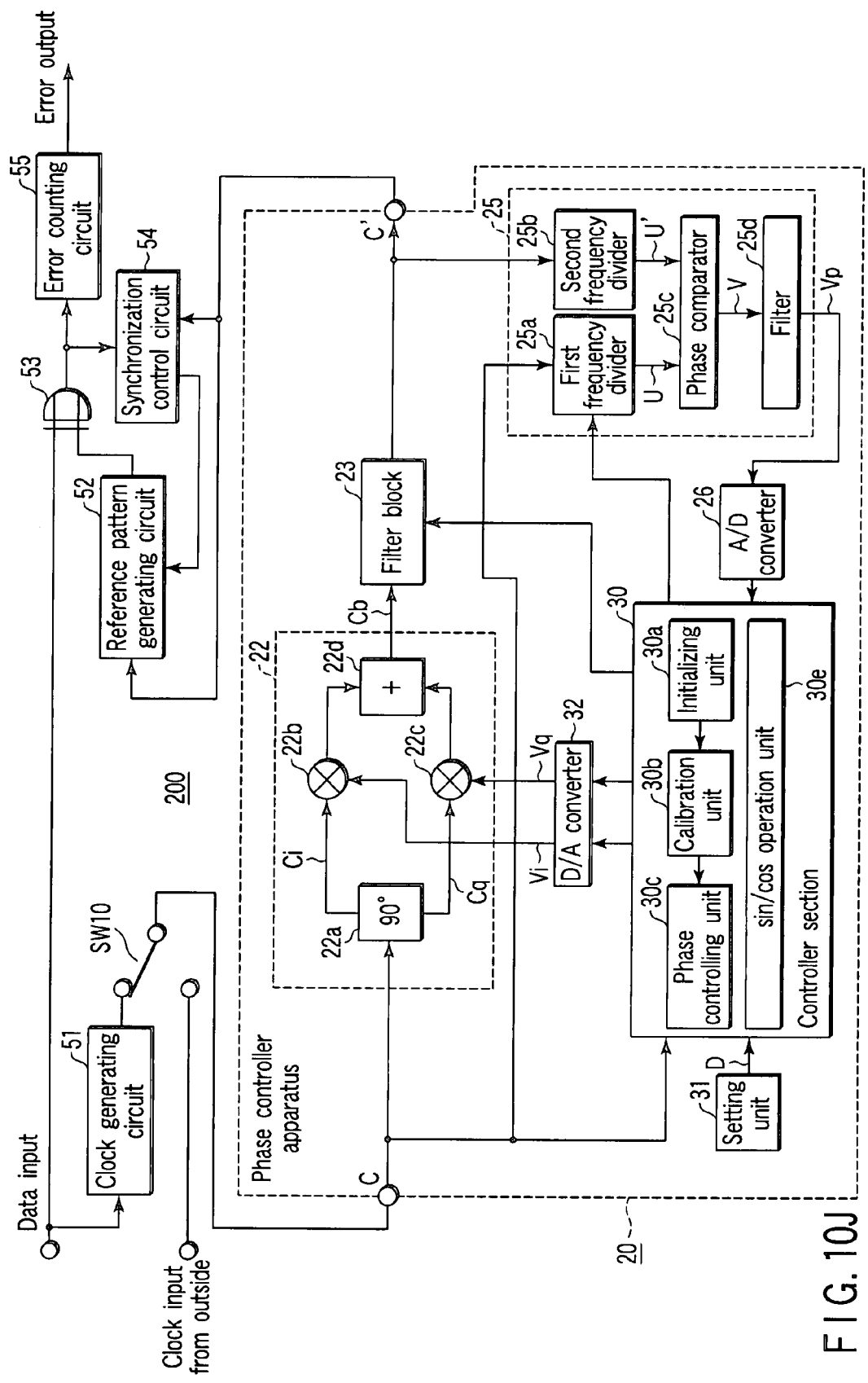
F I G. 10J

QUADRATURE MODULATOR WITH PHASE CONTROLLER APPARATUS AND ERROR DETECTOR

TECHNICAL FIELD

The present invention relates to a phase controller apparatus, and a pulse pattern generator and an error detector using the phase controller apparatus, and particularly to a phase controller apparatus which gives a desired delay by using a quadrature modulator, free from effect of error in the quadrature modulator even when a signal frequency is varied into a wide band, and the pulse pattern generator and the error detector using the phase controller apparatus.

BACKGROUND ART

For example, in a measurement system for data signal using a pulse pattern generator and an error detector, a phase controller apparatus which gives a desired delay to a clock signal is used.

As a delay device which gives a desired delay to a signal, there has been hitherto known a trombone-shaped delay device which varies the length of a signal line mechanically, for example, as disclosed in Jpn. Pat. Appln. KOKAI Publication No. 11-163608.

The trombone-shaped delay device, however, has problems of upsizing and response speed.

When the frequency of a signal to be delayed varies in quite a wide range, for example, from 100 MHz to 10 GHz, the trombone-shaped delay device requires the movable range of wavelength for the minimum frequency and a desired resolution at the wavelength of the maximum frequency, hence to increase in size and need an extremely high mechanical accuracy.

On the other hand, as the delay device which gives a delay electronically, there is known a delay device using a quadrature modulator.

Generally, the quadrature modulator is used for a digital modulator which modulates a local signal of higher frequency with the two-phase of digital baseband signals I and Q.

The quadrature modulator may be used as the electronic delay device which gives direct current voltage instead of the baseband signals I and Q, thereby supplies and outputs the signal input as the local signal with the desired delay corresponding to the direct current voltage.

FIG. 11A is a block diagram showing the structure in a case that performing signal delaying by using the quadrature modulator as the phase controller apparatus according to the prior art.

As shown in FIG. 11A, in the quadrature modulator used as the electronic delay device, a first signal C as the local signal of frequency f is supplied to a 90-degree phase shifter 11.

The 90-degree phase shifter 11 divides the first signal C into two signals Ci and Cq which have a phase difference of 90 degrees from each other and outputs them.

The two signals Ci and Cq input from the 90-degree phase shifter 11 are output to each one end of a first mixer 12 and a second mixer 13.

Desired direct current voltages Vi and Vq satisfying the following relations are supplied to each another end of the first mixer 12 and the second mixer 13.

$Vi = \cos\theta$ $Vq = \sin\theta$

The respective outputs from the first mixer 12 and the second mixer 13 are combined with each other in an adder 14.

FIG. 11B is a vector diagram for use in describing an operation principle in a case that performing signal delaying by using the quadrature modulator as the phase controller apparatus according to the prior art.

As shown in FIG. 11B, by supplying the desired direct current voltages Vi and Vq satisfying the relation of $Vi = \cos\theta$ and $Vq = \sin\theta$ to the respective other ends of the first and second mixers 12 and 13 and combining them in the adder 14, a second signal C' which is delayed only at a desired phase angle θ (unit is radian) against the first signal C can be obtained.

More specifically, when the two signals Ci and Cq having a phase difference of 90 degrees from each other are defined as $Ci = \cos(2\pi ft) = C$ $Cq = \sin(2\pi ft)$, the second signal C' output from the adder 14 becomes as follows.

$$C' = Ci \cdot Vi + Cq \cdot Vq$$
$$= \cos(2\pi ft) \cdot \cos\theta + \sin(2\pi ft) \cdot \sin\theta$$
$$= [\cos(2\pi ft + \theta) + \cos(2\pi ft - \theta)]/2 - [\cos(2\pi ft + \theta) - \cos(2\pi ft - \theta)]/2$$
$$= \cos(2\pi ft - \theta)$$

Therefore, the second signal C' which is delayed at only the phase angle θ (the unit is radian) against the first signal C can be obtained.

By varying the direct current voltages Vi and Vq in the above-mentioned relation, the second signal C' having a desired delay against the original first signal C can be obtained.

The phase angle θ is determined by a ratio of the direct current voltages Vi and Vq as below.

$\theta = \tan^{-1}(Vq/Vi)$

When the period of the first signal C is T, $\theta = 2\pi\tau/T$ is satisfied between the phase angle θ and the delay time τ.

Therefore, the second signal C' may be expressed as $C' = \cos[(2\pi/T)(t-\tau)]$.

Here, the (t−τ) defines the delay amount of the second signal C' against the first signal C.

The quadrature modulator, however, has a quadrature error in the phase shifter 11, gain errors in the mixers 12 and 13, and an offset error independent of the direct current voltages Vi and Vq.

Therefore, it is necessary to compensate these errors in order to give the proper delay amount as (t−τ) to the second signal C' obtained by the quadrature modulator.

For example, when there is a phase error φ in the phase shifter 11 on the side of the output signal Cq, $Cq' = \sin(2\pi ft + \phi)$ is satisfied and a second signal C'' at this time becomes as follows.

$$C'' = \cos(2\pi ft) \cdot \cos\theta + \sin(2\pi ft + \phi) \cdot \sin\theta$$

$$= [\cos(2\pi ft + \theta) + \cos(2\pi ft - \theta)]/2 - [\cos(2\pi ft + \phi + \theta) - \cos(2\pi ft + \phi - \theta)]/2$$

$$= A \cdot \cos(2\pi ft - \theta + \phi/2) + B \cdot \sin(2\pi ft + \theta + \phi/2)$$

where, $A = \cos(\phi/2)$, $B = \sin(\phi/2)$

As a result, in the second signal C" obtained by the above formula decreases in amplitude by the phase error φ compared with the ideal second signal C' as described above, and it becomes such a configuration that the signal in the first term with the phase advanced by φ/2 overlaps with the signal in the second term of the phase totally different from that of the first term.

Further, since the frequency of the first term is equal to the frequency of the second term in the above formula, the first term and the second term cannot be separated even when it passes through a filter.

When there is an offset error independent of the direct current voltages Vi and Vq in the quadrature modulator, an error occurs in the phase delay of the signal obtained by applying the direct current voltages Vi and Vq.

In order to compensate these errors in the quadrature modulator, for example, a technique about a carrier quadrature error detection method of the quadrature modulator and a quadrature modulating device disclosed in US2004/0250192A1 may be adopted.

In the carrier quadrature error detection method of the quadrature modulator according to the US2004/0250192A1, in a state that the signal levels of the I and Q signals are each made to be zero, a pair of direct current voltages for causing the modulating signal output from the quadrature modulator to be a predetermined reference level, are each added to the I and Q signals. In a state that pairs of direct current voltages are each changed and sequentially added to the I and Q signals, plural combinations of pairs of direct current voltages for making a signal level of the modulating signal output from the quadrature modulator at the predetermined reference level, are retrieved. Then, the quadrature error is calculated from simultaneous equations in which respective values of the retrieved plural combinations of pairs of direct current voltages, the signal level of the modulating signal output from the quadrature modulator, and a quadrature error of the carrier signals are defined as variables.

Since each error of the quadrature modulator shows frequency dependence, it is very difficult to cope with the error according to the technique disclosed in the US2004/0250192A1 when the frequency of the signal to be controlled varies in a wide range as described above.

Therefore, when realizing the pulse pattern generator and the error detector using the quadrature modulator as the phase controller apparatus, it is very difficult to realize them with a high accuracy, respectively.

DISCLOSURE OF INVENTION

In order to solve the problems, an object of the invention is to provide a phase controller apparatus which can give a desired delay to a signal to be phase-modulated, without effect of errors in the quadrature modulator even when the frequency of the signal varies in a wide range, and a pulse pattern generator and an error detector using the phase controller apparatus.

According to a first aspect of the present invention for achieving the above object, there is provided a phase controller apparatus (20, 20') comprising:

a quadrature modulator (22) which divides a first signal (C) input as a local signal into an I channel signal (Ci) and a Q channel signal (Cq) orthogonal to each other and outputs a second signal (C') having a desired phase delay (D) relative to the first signal (Ca) by giving direct current voltages (Vi, Vq) to the I channel signal (Ci) and the Q channel signal (Cq) respectively;

a phase comparison unit (25) which detects a phase difference (θ) between the first signal (C) and the second signal (C');

a setting unit (31) which sets the desired phase delay (D); and a controller section (30) which controls the direct current voltages (Vi, Vq) given to the I channel signal (Ci) and the Q channel signal (Cq) respectively in the quadrature modulator (22) so that an output value corresponding to the phase difference (θ) detected by the phase comparison unit (25) is equal to a value corresponding to the desired phase delay (D) set by the setting unit (31) and controls the direct current voltages (Vi, Vq) to be Vi and Vq satisfying the relation of Vi=cos θ and Vq=sin θ.

According to a second aspect of the present invention for achieving the above object, there is provided the phase controller apparatus (20, 20') according to the first aspect, wherein the phase comparison unit (25) has:

a first frequency divider (25a) which divides the first signal (C) by a predetermined dividing ratio (M);

a second frequency divider (25b) which divides the second signal (C') by identical dividing ratio as that of the first frequency divider (25a);

a phase comparator (25c) which detects a phase difference (θ) between an output signal (U) from the first frequency divider (25a) and an output signal (U') from the second frequency divider (25b); and a filter (25d) which extracts an output voltage (Vp) of a direct current component from an output signal (V) indicating the phase difference (θ) detected by the phase comparator (25c), and the phase controller apparatus (20, 20') further comprises an analog/digital converter (26) which converts the output voltage (Vp) of the direct current component extracted by the filter (25d) into digital values and supplies the digital values to the controller section (30) as an output value corresponding to the phase difference (θ) detected by the phase comparison unit (25).

According to a third aspect of the present invention for achieving the above object, there is provided the phase controller apparatus (20, 20') according to the second aspect, wherein the controller section (30) comprises:

an initializing unit (30a) which sets the output voltage (Vp) supplied from the phase comparison unit (25) so as to change monotonously corresponding to a monotonous change of the phase difference (θ) of the second signal (C') against the first signal (C) within a predetermined range, thereby matching an internal condition of the first frequency divider (25a) with an internal condition of the second frequency divider (25b) at a startup time;

a calibration unit (30b) which obtains an initial output value (Vp1) and a final output value (Vp2) from the phase comparison unit (25) by changing the direct current voltages (Vi, Vq) supplied to the I channel signal (Ci) and the Q channel signal (Cq) respectively in the quadrature modulator (22), thereby varying the phase difference (θ) between the first signal (C) and the second signal (C') by one period, after the setting by the initializing unit (30a), and obtains a following formula representing a linear formula having constant gradient $$Vr=(Vp2-Vp1)\theta+(Vp1+Vp2)/2$$

(where, the unit of θ is UI), the formula indicating a relation between an output reference value (Vr) from the phase comparison unit (25) giving the phase difference (θ) corresponding to the desired phase delay (D) set by the setting unit (31) and the initial value (Vp1) and the final value (Vp2), as a theoretical characteristic formula of the phase comparison unit (25); and a phase controlling unit (30c) which compares the output voltage (Vp) from the phase comparison unit (25), which is obtained by giving the direct current voltages (Vi, Vq) involved in the phase difference (θ) corresponding to the desired phase delay (D) set by the setting unit (31) to the I channel signal (Ci) and the Q channel signal (Cq) respectively in the quadrature modulator (22), with the output reference value (Vr) obtained by the theoretical characteristic formula, as to the phase difference (θ) corresponding to the desired phase delay (D) and controls the direct current voltages (Vi, Vq) given to the I channel signal (Ci) and the Q channel signal (Cq) respectively in the quadrature modulator (22) so that the output voltage (Vp) from the phase comparison unit (25) is within the range of allowance set for the output reference value (Vr), after the calibration unit (30b) obtains the theoretical characteristic formula.

According to a fourth aspect of the present invention for achieving the above object, there is provided the phase controller apparatus (20, 20') according to the second aspect, wherein the predetermined dividing ratio (M) includes one of 16 and 32.

According to a fifth aspect of the present invention for achieving the above object, there is provided the phase controller apparatus (20, 20') according to the first aspect, wherein the phase comparison unit (25) includes an Exclusive-OR type (EX-OR) phase comparator (25c).

According to a sixth aspect of the present invention for achieving the above object, there is provided the phase controller apparatus (20, 20') according to the first aspect, wherein the quadrature modulator (22) comprises:

a 90-degree phase shifter (22a) which divides the first signal (Ca) input as the local signal into the I channel signal (Ci) and the Q channel signal (Cq) orthogonal to each other;

a first mixer (22b) and a second mixer (22c) which respectively give the direct current voltages (Vi, Vq) to the I channel signal (Ci) and the Q channel signal (Cq) output from the 90-degree phase shifter (22a); and an adder (22d) which adds each of outputs from the first mixer (22b) and the second mixer (22c) and outputs a second signal (Cb) having the desired phase delay (D) according to the direct current voltages (Vi, Vq).

According to a seventh aspect of the present invention for achieving the above object, there is provided the phase controller apparatus (20, 20') according to the sixth aspect, wherein the controller section (30) has a sin/cos table (30d) in which the predetermined direct current voltages (Vi, Vq) indicated by a sine value/cosine value corresponding to the desired phase delay (D) arbitrarily set in a range of 0 to π to 2π at predetermined intervals by the setting unit (31) are stored as digital data, and the phase controller apparatus (20, 20') further has a digital/analog converter (32) which converts the digital data of the predetermined direct current voltages (Vi, Vq) read out from the sin/cos table (30d) of the controller section (30) into analog values and supplies the analog values to the first mixer (22b) and the second mixer (22c), respectively.

According to an eighth aspect of the present invention for achieving the above object, there is provided the phase controller apparatus (20, 20') according to the sixth aspect, wherein the controller section (30) has a sin/cos operation unit (30e) which calculates the digital data of the predetermined direct current voltages (Vi, Vq) indicated by a sine value/cosine value corresponding to the desired phase delay (D) arbitrarily set in a range of 0 to π to 2π at predetermined intervals by the setting unit (31), and the phase controller apparatus (20, 20') further has a digital/analog converter (32) which converts the digital data of the predetermined direct current voltages (Vi, Vq) calculated in the sin/cos operation unit (30e) of the controller section (30) into analog values and supplies the analog values to the first mixer (22b) and the second mixer (22c), respectively.

According to a ninth aspect of the present invention for achieving the above object, there is provided the phase controller apparatus (20, 20') according to the first aspect, further comprising:

a first filter block (21), when receiving a signal of rectangular wave as the first signal (C), which converts the first signal (C) of rectangular wave into the first signal (Ca) of sine wave and supplies the first signal to the quadrature modulator (22);

a second filter block (23) which receives the second signal (Cb) output from the quadrature modulator (22), eliminates spurious and direct current components from the second signal, and outputs a second signal (Cb') of sine wave; and a waveform shaper (24) which converts the second signal (Cb') of sine wave output from the second filter block (23) into a second signal (C') of rectangular wave and outputs the second signal (C') of rectangular wave.

According to a tenth aspect of the present invention for achieving the above object, there is provided the phase controller apparatus (20, 20') according to the ninth aspect, wherein each of filter members to be used as the first filter block (21) and the second filter block (23) selectively is set a from among plurality of low-pass filters (LPF) and band-pass filters (BPF) according to the frequency of the first signal (C) by the controller section (30).

According to an eleventh aspect of the present invention for achieving the above object, there is provided the phase controller apparatus (20, 20') according to the first aspect, further comprising a filter block (23) which, in the case of receiving a signal of sine wave as the first signal (C), receives the signal (Cb) output from the quadrature modulator (22), eliminates spurious and direct current components, and outputs the second signal (Cb') of sine wave.

According to a twelfth aspect of the present invention for achieving the above object, there is provided the phase controller apparatus (20, 20') according to the eleventh aspect, wherein filter members to be used as the filter block (23) selectively is set from among a plurality of low-pass filters (LPF) and band-pass filters (BPF) according to the frequency of the first signal (C) by the controller section (30).

According to a thirteenth aspect of the present invention for achieving the above object, there is provided a pulse pattern generator (100, 100') comprising:

a pulse pattern generating unit (40) which generates a desired pulse pattern signal;

a phase controller apparatus (20, 20') which controls a phase difference between the desired pulse pattern signal from the pulse pattern generating unit (40) and a clock signal; and a pulse pattern output unit (46) which outputs the desired pulse pattern signal with a predetermined correction applied to the desired pulse pattern signal whose phase difference against the clock signal is controlled by the phase controller apparatus (20, 20') after generated by the pulse pattern generating unit (40) and, wherein the phase controller apparatus (20, 20') comprises:

a quadrature modulator (22) which divides a first signal (C) being the clock signal input as a local signal into an I channel signal (Ci) and a Q channel signal (Cq) orthogonal to each other and outputs a second signal (C') having a desired phase delay (D) relative to the first signal (C) by giving direct current voltages (Vi, Vq) to the I channel signal (Ci) and the Q channel signal (Cq) respectively;

a phase comparison unit (25) which detects a phase difference (θ) between the first signal (C) and the second signal (C');

a setting unit (31) which sets the desired phase delay (D); and a controller section (30) which controls the direct current voltages (Vi, Vq) given to the I channel signal (Ci) and the Q channel signal (Cq) respectively in the quadrature modulator (22) so that an output value corresponding to the phase difference (θ) detected by the phase comparison unit (25) is equal to a value corresponding to the desired phase delay (D) set by the setting unit (31), and controls the direct current voltages (Vi, Vq) to be Vi and Vq satisfying the relation of Vi=cos θ and Vq=sin θ.

According to a fourteenth aspect of the present invention for achieving the above object, there is provided the pulse pattern generator (100, 100') according to the thirteenth aspect, wherein the pulse pattern generating unit (40) comprises:

a clock generating circuit (41) which generates the clock signal;

a word pattern generating unit (42) which generates a word pattern signal, based on the clock signal from the clock generating circuit (41);

a pseudo-random pattern generating unit (42) which generates a pseudo-random pattern signal, based on the clock signal from the clock generating circuit (41); and a switch (SW) which switches the word pattern signal from the word pattern generating unit (42) and the pseudo-random pattern signal from the pseudo-random pattern generating unit (42) to output as the desired pulse pattern signal.

According to a fifteenth aspect of the present invention for achieving the above object, there is provided the pulse pattern generator (100, 100') according to the fourteenth aspect, wherein the pulse pattern output unit (46) has:

a D-flip flop (44) which, by receiving the desired pulse pattern signal from the switch (SW) at its data input end (D) and also receiving the second signal (C') having the desired phase delay (D) corresponding to the predetermined direct current voltages (Vi, Vq) against the first signal (C) from the phase controller apparatus (20, 20') at its clock input end (CK), outputs the desired pulse pattern signal whose phase difference (θ) against the clock signal supplied from the clock generating circuit (41) is controlled by the phase controller apparatus (20, 20') that controls the phase difference (θ) against the clock signal supplied from the clock generating circuit (41); and an output circuit (45) which applies an amplitude correction and a direct current (DC) components correction to the desired pulse pattern signal phase difference (θ)-controlled and supplied from the D-flip flop (44) to output as data output.

According to a sixteenth aspect of the present invention for achieving the above object, there is provided the pulse pattern generator (100, 100') according to the fifteenth aspect, wherein the clock signal from the clock generating circuit (41) is output to the outside as a clock output together with the data output.

According to a seventeenth aspect of the present invention for achieving the above object, there is provided the pulse pattern generator (100, 100') according to the thirteenth aspect, wherein the phase comparison unit (25) of the phase controller apparatus (20, 20') has:

a first frequency divider (25*a*) which divides the first signal (C) by a predetermined dividing ratio (M);

a second frequency divider (25*b*) which divides the second signal (C') by identical dividing ratio as that of the first frequency divider (25*a*);

a phase comparator (25*c*) which detects a phase difference (θ) between an output signal (U) from the first frequency divider (25*a*) and an output signal (U') from the second frequency divider (25*b*); and a filter (25*d*) which extracts an output voltage (Vp) of a direct current component from an output signal (V) indicating the phase difference (θ) detected by the phase comparator (25*c*), and the phase controller apparatus (20, 20') further comprises an analog/digital converter (26) which converts the output voltage (Vp) of the direct current component extracted by the filter (25*d*) into digital values and supplies the digital values to the controller section (30) as an output value corresponding to the phase difference (θ) detected by the phase comparison unit (25).

According to an eighteenth aspect of the present invention for achieving the above object, there is provided the pulse pattern generator (100, 100') according to the fourteenth aspect, wherein the controller section (30) of the phase controller apparatus (20, 20') comprises:

an initializing unit (30*a*) which sets the output voltage (Vp) supplied from the phase comparison unit (25) so as to change monotonously corresponding to a monotonous change of the phase difference (θ) of the second signal (C') against the first signal (C) within a predetermined range, thereby matching an internal condition of the first frequency divider (25*a*) with an internal condition of the second frequency divider (25*b*) at a startup time;

a calibration unit (30*b*) which obtains an initial output value (Vp1) and a final output value (Vp2) from the phase comparison unit (25) by changing the direct current voltages (Vi, Vq) supplied to the I channel signal (Ci) and the Q channel signal (Cq) respectively in the quadrature modulator (22), thereby varying the phase difference (θ) between the first signal (C) and the second signal (C') by one period, after the setting by the initializing unit (30*a*), and obtains a following formula representing a linear formula having constant gradient $$Vr=(Vp2-Vp1)\theta+(Vp1+Vp2)/2$$

(where, the unit of θ is UI), the formula indicating a relation between an output reference value (Vr) from the phase comparison unit (25) giving the phase difference (θ) corresponding to the desired phase delay (D) set by the setting unit (31) and the initial value (Vp1) and the final value (Vp2), as a theoretical characteristic formula of the phase comparison unit (25); and a phase controlling unit (30*c*) which compares the output voltage (Vp) from the phase comparison unit (25), which is obtained by giving the direct current voltages (Vi, Vq) involved in the phase difference (θ) corresponding to the desired phase delay (D) set by the setting unit (31) to the I channel signal (Ci) and the Q channel signal (Cq) respectively in the quadrature modulator (22), with the output reference value (Vr) obtained by the theoretical characteristic formula, as for the phase difference (θ) corresponding to the desired phase delay (D), and controls the direct current voltages (Vi, Vq) given to the I channel signal (Ci) and the Q channel signal (Cq) respectively in the quadrature modulator (22) so that the output voltage (Vp) from the phase comparison unit (25) is within the range of allowance set as for the output reference value (Vr), after the calibration unit (30b) obtains the theoretical characteristic formula.

According to a nineteenth aspect of the present invention for achieving the above object, there is provided the pulse pattern generator (100, 100') according to the fourteenth aspect, wherein the predetermined dividing ratio (M) includes one of 16 and 32.

According to a twentieth aspect of the present invention for achieving the above object, there is provided the pulse pattern generator (100, 100') according to the thirteenth aspect, wherein the phase comparison unit (25) of the phase controller apparatus (20, 20') includes an Exclusive-OR type (EX-OR) phase comparator (25c).

According to a twenty-first aspect of the present invention for achieving the above object, there is provided the pulse pattern generator (100, 100') according to the thirteenth aspect, wherein the quadrature modulator (22) of the phase controller apparatus (20, 20') comprises:

a 90-degree phase shifter (22a) which divides the first signal (Ca) being the clock signal input as the local signal into the I channel signal (Ci) and the Q channel signal (Cq) orthogonal to each other;

a first mixer (22b) and a second mixer (22c) which respectively give the direct current voltages (Vi, Vq) to the I channel signal (Ci) and the Q channel signal (Cq) output from the 90-degree phase shifter (22a); and an adder (22d) which adds each of outputs from the first mixer (22b) and the second mixer (22c) and outputs a second signal (Cb) having the desired phase delay (D) according to the direct current voltages (Vi, Vq).

According to a twenty-second aspect of the present invention for achieving the above object, there is provided the pulse pattern generator (100, 100') according to the twenty-first aspect, wherein the controller section (30) of the phase controller apparatus (20, 20') has a sin/cos table (30d) in which the direct current voltages (Vi, Vq) indicated by a sine value/cosine value corresponding to the desired phase delay (D) arbitrarily set in a range of 0 to π to 2π at predetermined intervals by the setting unit (31) are stored as digital data, and the phase controller apparatus (20, 20') further has a digital/analog converter (32) which converts the digital data of the direct current voltages (Vi, Vq) read out from the sin/cos table (30d) of the controller section (30) into analog values and supplies the analog values to the first mixer (22b) and the second mixer (22c), respectively.

According to a twenty-third aspect of the present invention for achieving the above object, there is provided the pulse pattern generator (100, 100') according to the twenty-first aspect, wherein the controller section (30) of the phase controller apparatus (20, 20') has a sin/cos operation unit (30e) which calculates the digital data of the direct current voltages (Vi, Vq) indicated by a sine value/cosine value corresponding to the desired phase delay (D) arbitrarily set in a range of 0 to π to 2π at predetermined intervals by the setting unit (31), and the phase controller apparatus (20, 20') further has a digital/analog converter (32) which converts the digital data of the predetermined direct current voltages (Vi, Vq) calculated in the sin/cos operation unit (30e) of the controller section (30) into analog values and supplies the analog values to the first mixer (22b) and the second mixer (22c), respectively.

According to a twenty-fourth aspect of the present invention for achieving the above object, there is provided the pulse pattern generator (100, 100') according to the thirteenth aspect, wherein the phase controller apparatus (20) further comprises:

a first filter block (21), when receiving a signal of rectangular wave as the first signal (C), which converts the first signal (C) of rectangular wave into the first signal (Ca) of sine wave and inputs the first signal to the quadrature modulator (22);

a second filter block (23) which receives the second signal (Cb) output from the quadrature modulator (22), eliminates spurious and direct current components from the second signal, and outputs a second signal (Cb') of sine wave; and a waveform shaper (24) which converts the second signal (Cb') of sine wave output from the second filter block (23) into the second signal (C') of rectangular wave and outputs the second signal (C') of rectangular wave.

According to a twenty-fifth aspect of the present invention for achieving the above object, there is provided the pulse pattern generator (100, 100') according to the twenty-fourth aspect, wherein each of filter members to be used as the first filter block (21) and the second filter block (23) selectively is set from among a plurality of low-pass filters (LPF) and band-pass filters (BPF) according to the frequency of the first signal (C) by the controller section (30).

According to a twenty-sixth aspect of the present invention for achieving the above object, there is provided the pulse pattern generator (100, 100') according to the thirteenth aspect, wherein the phase controller apparatus (20) further comprises a filter block (23) which, in the case of receiving a signal of sine wave as the first signal (C), receives the signal (Cb) output from the quadrature modulator (22), eliminates spurious and direct current components, and outputs the second signal (Cb') of sine wave.

According to a twenty-seventh aspect of the present invention for achieving the above object, there is provided the pulse pattern generator (100, 100') according to the twenty-sixth aspect, wherein filter members to be used as the filter block (23) selectively is set from among a plurality of low-pass filters (LPF) and band-pass filters (BPF) according to the frequency of the first signal (C) by the controller section (30).

According to a twenty-eighth aspect of the present invention for achieving the above object, there is provided an error detector (200, 200') comprising:

a phase controller apparatus (20, 20') which controls a phase of a clock signal (C) input from outside;

a reference pattern generating circuit (52) which generates a desired reference pattern signal based on the clock signal (C') phase-controlled by the phase controller apparatus (20, 20');

an Exclusive-OR circuit (53) which compares a signal to be error-detected as a data input signal input from the outside with the desired reference pattern signal supplied from the reference pattern generating circuit (52) by the unit of bit and outputs a bit error signal;

a synchronization control circuit (54) which controls a phase of a synchronization signal for making an output timing of the desired reference pattern signal input from the reference pattern generating circuit (52) based on the bit error signal supplied from the Exclusive-OR circuit (53) and the clock signal (C') phase-controlled by the phase controller apparatus (20, 20') agree with an input timing of the error-detected signal input from the outside by the unit of bit; and an error counting circuit (55) which counts the bit error signal from the Exclusive-OR circuit (53) and outputs the signal, wherein the phase controller apparatus (20, 20') comprises:

a quadrature modulator (22) which divides a first signal (C) being the clock signal input as a local signal into an I channel signal (Ci) and a Q channel signal (Cq) orthogonal to each other and outputs a second signal (C') having a desired phase delay (D) relative to the first signal (C) by giving direct current voltages (Vi, Vq) to the I channel signal (Ci) and the Q channel signal (Cq) respectively;

a phase comparison unit (25) which detects a phase difference ($\theta$) between the first signal (C) and the second signal (C');

a setting unit (31) which sets the desired phase delay (D); and a controller section (30) which controls the direct current voltages (Vi, Vq) given to the I channel signal (Ci) and the Q channel signal (Cq) respectively in the quadrature modulator (22) so that an output value corresponding to the phase difference ($\theta$) detected by the phase comparison unit (25) is equal to a value corresponding to the desired phase delay (D) set by the setting unit (31), and controls the direct current voltages (Vi, Vq) to be Vi and Vq satisfying the relation of Vi=cos $\theta$ and Vq=sin $\theta$.

According to a twenty-ninth aspect of the present invention for achieving the above object, there is provided the error detector (200, 200') according to the twenty-eighth aspect, further comprising:

a clock generating circuit (51) which reproduces a clock signal of rectangular wave included in the error-detected signal as a data input signal input from the outside and outputs the clock signal; and a switch (SW10) which switches the clock signal supplied from the clock generating circuit (51) and the clock signal input from the outside to output as the first signal (C) being the clock signal input as the local signal to the phase controller apparatus (20, 20').

According to a thirtieth aspect of the present invention for achieving the above object, there is provided the error detector (200, 200') according to the twenty-ninth aspect, wherein the clock generating circuit (51) uses the clock signal input from the outside when it is difficult to reproduce the clock signal of rectangular wave included in the error-detected signal as the data input signal.

According to a thirty-first aspect of the present invention for achieving the above object, there is provided the error detector (200, 200') according to the twenty-eighth aspect, wherein the reference pattern generating circuit (52) has:

a word pattern generating unit (42) which generates a word pattern signal based on the clock signal;

a pseudo-random pattern generating unit (43) which generates a pseudo-random pattern signal based on the clock signal; and a switch (SW) which switches the word pattern signal from the word pattern generating unit (42) and the pseudo-random pattern signal from the pseudo-random pattern generating unit (43) to output as the desired pulse pattern signal.

According to a thirty-second aspect of the present invention for achieving the above object, there is provided the error detector (200, 200') according to the twenty-eighth aspect, wherein the phase comparison unit (25) of the phase controller apparatus (20, 20') has:

a first frequency divider (25a) which divides the first signal (C) by a predetermined dividing ratio (M);

a second frequency divider (25b) which divides the second signal (C') by identical dividing ratio as that of the first frequency divider (25a);

a phase comparator (25c) which detects a phase difference ($\theta$) between an output signal (U) from the first frequency divider (25a) and an output signal (U') from the second frequency divider (25b); and a filter (25d) which extracts an output voltage (Vp) of direct current components from an output signal (V) indicating the phase difference ($\theta$) detected by the phase comparator (25c), and the phase controller apparatus (20, 20') further comprises an analog/digital converter (26) which converts the output voltage (Vp) of the direct current component extracted by the filter (25d) into digital values and supplies the digital values to the controller section (30) as an output value corresponding to the phase difference ($\theta$) detected by the phase comparison unit (25).

According to a thirty-third aspect of the present invention for achieving the above object, there is provided the error detector (200, 200') according to the twenty-ninth aspect, wherein the controller section (30) of the phase controller apparatus (20, 20') comprises:

an initializing unit (30a) which sets the output voltage (Vp) supplied from the phase comparison unit (25) so as to change monotonously corresponding to a monotonous change of the phase difference ($\theta$) of the second signal (C') against the first signal (C) within a predetermined range, thereby matching an internal condition of the first frequency divider (25a) with an internal condition of the second frequency divider (25b) at a startup time;

a calibration unit (30b) which obtains an initial output value (Vp1) and a final output value (Vp2) from the phase comparison unit (25) by changing the direct current voltages (Vi, Vq) supplied to the I channel signal (Ci) and the Q channel signal (Cq) respectively in the quadrature modulator (22), thereby varying the phase difference ($\theta$) between the first signal (C) and the second signal (C') by one period, after the setting by the initializing unit (30a) and obtains a following formula representing a linear formula having constant gradient $$Vr=(Vp2-Vp1)\theta+(Vp1+Vp2)/2$$

(where, the unit of $\theta$ is UI)

the formula indicating a relation between an output reference value (Vr) from the phase comparison unit (25) giving the phase difference ($\theta$) corresponding to the desired phase delay (D) set by the setting unit (31) and the initial value (Vp1) and the final value (Vp2), as a theoretical characteristic formula of the phase comparison unit (25); and a phase controlling unit (30c) which compares the output voltage (Vp) from the phase comparison unit (25), which is obtained by giving the direct current voltages (Vi, Vq) involved in the phase difference ($\theta$) corresponding to the desired phase delay (D) set by the setting unit (31) to the I channel signal (Ci) and the Q channel signal (Cq) respectively in the quadrature modulator (22), with the output reference value (Vr) obtained by the theoretical characteristic formula, as for the phase difference ($\theta$) corresponding to the desired phase delay (D) and controls the direct current voltages (Vi, Vq) given to the I channel signal (Ci) and the Q channel signal (Cq) respectively in the quadrature modulator (22) so that the output voltage (Vp) from the phase comparison unit (25) is within the range of allowance set as for the output reference value (Vr), after the calibration unit (30b) obtains the theoretical characteristic formula.

According to a thirty-fourth aspect of the present invention for achieving the above object, there is provided the error detector (200, 200') according to the twenty-ninth aspect, wherein the predetermined dividing ratio (M) includes one of 16 and 32.

According to a thirty-fifth aspect of the present invention for achieving the above object, there is provided the error detector (200, 200') according to the twenty-eighth aspect, wherein the phase comparison unit (25) of the phase controller apparatus (20, 20') includes an Exclusive-OR type (EX-OR) phase comparator (25c).

According to a thirty-sixth aspect of the present invention for achieving the above object, there is provided the error detector (200, 200') according to the twenty-eighth aspect, wherein the quadrature modulator (22) of the phase controller apparatus (20, 20') comprises:

a 90-degree phase shifter (22a) which divides the first signal (Ca) being the clock signal input as the local signal into the I channel signal (Ci) and the Q channel signal (Cq) orthogonal to each other;

a first mixer (22b) and a second mixer (22c) which respectively give the direct current voltages (Vi, Vq) to the I channel signal (Ci) and the Q channel signal (Cq) output from the 90-degree phase shifter (22a); and an adder (22d) which adds each of outputs from the first mixer (22b) and the second mixer (22c) and outputs a second signal (Cb) having the desired phase delay (D) according to the direct current voltages (Vi, Vq).

According to a thirty-seventh aspect of the present invention for achieving the above object, there is provided the error detector (200, 200') according to the thirty-sixth aspect, wherein the controller section (30) of the phase controller apparatus (20, 20') has a sin/cos table (30d) in which the direct current voltages (Vi, Vq) indicated by a sine value/cosine value corresponding to the desired phase delay (D) arbitrarily set in a range of 0 to $\pi$ to $2\pi$ at predetermined intervals by the setting unit (31) are stored as digital data, and the phase controller apparatus (20, 20') further has a digital/analog converter (32) which converts the digital data of the direct current voltages (Vi, Vq) read out from the sin/cos table (30d) of the controller section (30) into analog values and supplies the analog values to the first mixer (22b) and the second mixer (22c), respectively.

According to a thirty-eighth aspect of the present invention for achieving the above object, there is provided the error detector (200, 200') according to the thirty-sixth aspect, wherein the controller section (30) of the phase controller apparatus (20, 20') has a sin/cos operation unit (30e) which calculates the digital data of the direct current voltages (Vi, Vq) indicated by a sine value/cosine value corresponding to the desired phase delay (D) arbitrarily set in a range of 0 to $\pi$ to $2\pi$ at predetermined intervals by the setting unit (31), and the phase controller apparatus (20, 20') further has a digital/analog converter (32) which converts the digital data of the direct current voltages (Vi, Vq) calculated in the sin/cos operation unit (30e) of the controller section (30) into analog values and supplies the analog values to the first mixer (22b) and the second mixer (22c), respectively.

According to a thirty-ninth aspect of the present invention for achieving the above object, there is provided the error detector (200, 200') according to the twenty-eighth aspect, wherein the phase controller apparatus (20) further comprises:

a first filter block (21), when receiving a signal of rectangular wave as the first signal (C), which converts the first signal (C) of rectangular wave into the first signal (Ca) of sine wave and inputs the first signal to the quadrature modulator (22);

a second filter block (23) which receives the second signal (Cb) output from the quadrature modulator (22), eliminates spurious and direct current components from the second signal, and outputs a second signal (Cb') of sine wave; and a waveform shaper (24) which converts the second signal (Cb') of sine wave output from the second filter block (23) into the second signal (C') of rectangular wave and outputs the second signal (C') of rectangular wave.

According to a fortieth aspect of the present invention for achieving the above object, there is provided the error detector (200, 200') according to the thirty-ninth aspect, wherein each of filter members to be used as the first filter block (21) and the second filter block (23) selectively is set from among a plurality of low-pass filters (LPF) and band-pass filters (BPF) according to the frequency of the first signal (C) by the controller section (30).

According to a forty-first aspect of the present invention for achieving the above object, there is provided the error detector (200, 200') according to the twenty-eighth aspect, wherein the phase controller apparatus (20') further comprises a filter block (23) which, in the case of receiving a signal of sine wave as the first signal (C), receives the signal (Cb) output from the quadrature modulator (22), eliminates spurious and direct current components from the signal, and outputs the second signal (Cb') of sine wave.

According to a forty-second aspect of the present invention for achieving the above object, there is provided the error detector (200, 200') according to the forty-first aspect, wherein filter members to be used as the filter block (23) selectively is set from among the plurality of low-pass filters (LPF) and band-pass filters (BPF) according to the frequency of the first signal (C) by the controller section (30).

In this way, in the phase controller apparatus according to the invention, the first signal input to the quadrature modulator and the second signal output from the quadrature modulator are input into the phase comparison unit, and the direct current voltage input to the quadrature modulator is controlled in a variable way to make an output value of the phase comparison unit be the value corresponding to the desired phase delay, hence to obtain the second signal having the desired delay with respect to the first signal to be phase-controlled, without effect of the quadrature error in the quadrature modulator.

Further, the pulse pattern generator and the error detector according to the invention use the phase controller apparatus, as mentioned above, in which the first signal input to the quadrature modulator and the second signal output from the quadrature modulator are input into the phase comparison unit and the direct current voltage input to the quadrature modulator is controlled in a variable way to make the output value of the phase comparison unit be the value corresponding to the desired phase delay, hence to obtain the second signal having the desired delay with respect to the first signal to be phase-controlled, without effect of the quadrature error in the quadrature modulator.

Therefore, it is possible to realize the pulse pattern generator and the error detector having a high accuracy.

BRIEF DESCRIPTION OF DRAWINGS

FIG. 1A is a block diagram showing the structure when a phase controller apparatus according to the invention controls a phase of a rectangular wave signal, as a first embodiment.

FIG. 10A is a block diagram showing the structure when the phase controller apparatus according a second embodiment of the invention controls a phase of a sine wave signal.

FIG. 10D is a block diagram showing the structure of a pulse pattern generator using the phase controller apparatus according to the modification example of the first embodiment, as a modification example of the third embodiment according to the invention.

FIG. 10F is a block diagram showing the structure of a pulse pattern generator using the phase controller apparatus according to the modification example of the second embodiment, as a modification example of the fourth embodiment according to the invention.

FIG. 10H is a block diagram showing the structure of an error detector using the phase controller apparatus according to the modification example of the first embodiment, as a modification example of the fifth embodiment according to the invention.

FIG. 10J is a block diagram showing the structure of an error detector using the phase controller apparatus according to the modification example of the second embodiment, as a modification example of the sixth embodiment according to the invention.

BEST MODE FOR CARRYING OUT THE INVENTION

Figures 1B, 1C:
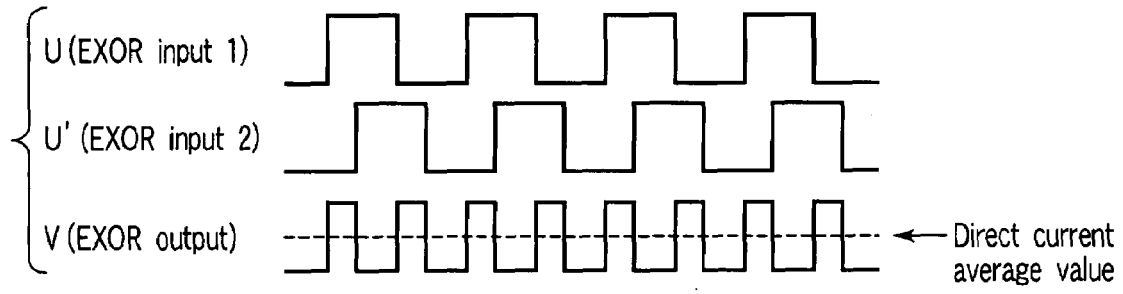
FIG. 1B is a timing chart for use in describing an operation of an EXOR-type phase comparator 25c used in a phase comparison unit 25 which forms a feedback control circuit in a phase controller apparatus 20 according to the first embodiment of the invention.
FIG. 1C is a view for use in describing the contents of a sin/cos table 30d used in a controller section 30 which forms the feedback control circuit in the phase controller apparatus 20 according to the first embodiment of the invention.

Hereinafter, embodiments of the invention will be described based on the drawings.

FIRST EMBODIMENT

FIG. 1A is a block diagram showing the structure when a phase controller apparatus 20 according to the invention controls a phase of a rectangular wave signal as a first embodiment.

The phase controller apparatus 20 according to the first embodiment shown in FIG. 1A basically comprises: a quadrature modulator 22 which divides a first signal C input as a local signal into an I channel signal Ci and a Q channel signal Cq orthogonal to each other and outputs a second signal C' having a desired phase delay D corresponding to direct current voltages Vi and Vq as for the first signal C by giving the direct current voltages Vi and Vq to the I channel signal Ci and the Q channel signal Cq respectively; a phase comparison unit 25 which detects a phase difference θ between the first signal C input to the quadrature modulator 22 and the second signal C' output from the quadrature modulator 22; a setting unit 31 for setting the desired phase delay D; and a controller section 30 which controls the direct current voltages supplied to the I channel signal Ci and the Q channel signal Cq respectively in the quadrature modulator 22 so that an output value corresponding to the phase difference θ detected by the phase comparison unit 25 may be equal to a value corresponding to the desired phase delay D set by the setting unit 31, and controls the direct current voltages to be the values Vi and Vq satisfying the relation of Vi=cos θ and Vq=sin θ.

More specifically, as shown in FIG. 1A, the phase controller apparatus 20 receives the rectangular wave signal such as a clock signal whose frequency varies in the range of 100 MHz to 10 GHz as the first signal C and finally outputs the second signal C' of the rectangular wave with the desired delay given to the first signal C.

The first signal C is converted into the first signal Ca of the sine wave by a first filter block 21 and input to the quadrature modulator 22.

Filter members to be used as the first filter block 21 selectively is set from among a plurality of low-pass filters (LPF) and band-pass filters (BPF), for example, according to the frequency of the first signal C by the controller section 30 described later.

The quadrature modulator 22 includes a 90-degree phase shifter 22a, a first mixer 22b, a second mixer 22c, and an adder 22d.

The first signal Ca of the sine wave from the first filter block 21 is input to the 90-degree phase shifter 22a as the local signal (also referred to as carrier signal).

The 90-degree phase shifter 22a divides the first signal Ca of the sine wave input as the local signal into the I channel signal Ci and the Q channel signal Cq orthogonal to each other and outputs them.

In order to apply the predetermined direct current voltages Vi and Vq (where, the Vi and Vq satisfy the relation of Vi=cos θ and Vq=sin θ) to the I channel signal Ci and the Q channel signal Cq respectively output from the 90-degree phase shifter 22a, the I channel signal Ci output from the 90-degree phase shifter 22a and the direct current voltage V1 from a digital/analog (D/A) converter 32 described later are input to the first mixer 22b at the side of the I channel, and the Q channel signal Cq output from the 90-degree phase shifter 22a and the direct current voltage Vq from the D/A converter 32 are input to the second mixer 22c at the side of the Q channel.

The respective outputs from the both mixers 22b and 22c are added in the adder 22d, hence to be output as the second signal Cb of substantial sine wave.

The second signal Cb is input to a second filter block 23 having substantially identical structure as the first filter block 21, where spurious and/or direct current components are eliminated from the second signal Cb. It is output as a second signal Cb' of sine wave from the block 23 to a waveform shaper 24, where the signal Cb' is converted into the second signal C' of rectangular wave, and the second signal C' is output.

The second signal C' from the waveform shaper 24 includes the quadrature error of the quadrature modulator 22 and the phase error caused by the offset error.

Then, in order to compensate the quadrature error of the quadrature modulator 22 and the phase error caused by the offset error included in the second signal C' from the waveform shaper 24, the second signal C' is input to the phase comparison unit 25 forming the feedback control circuit together with the first signal C.

The phase comparison unit 25 is formed by a first frequency divider 25a and a second frequency divider 25b which M-divide (M is, for example, 16, 32 and the like) the first signal C and the second signal C' respectively, an Exclusive-OR typed (EX-OR) phase comparator 25c for detecting the phase difference θ between the respective output signals U and U' from the respective frequency dividers 25a and 25b, and a filter 25d which extracts the average value (direct current component) Vp from an output signal V supplied from the phase comparator 25c.

In this case, it is assumed that the EX-OR typed phase comparator 25c having a simple internal structure and a small internal delay is used.

The first frequency divider 25a and the second frequency divider 25b are used for reducing the frequency of the input signal to the EX-OR typed phase comparator 25c, setting a duty ratio at one to one (50%), and setting an output voltage range of the filter 25d when the phase difference θ between the both signals C and C' is ±π, within the range of monotonous change according to the change of the phase difference θ, avoiding the dead band (the area in which the output does not change according to the change of the phase difference) of the EX-OR typed phase comparator 25c.

FIG. 1B is a timing chart for use in describing an operation of the EX-OR typed phase comparator 25c used in the phase comparison unit 25 which forms a feedback control circuit in the first embodiment of the phase controller apparatus 20 according to the invention.

As shown in FIG. 1B, upon receipt of the respective output signals U and U' from the first frequency divider 25a and the second frequency divider 25b, the EX-OR phase comparator 25c outputs such a phase difference detection signal V that it becomes high level during the period when one of the U and U' is at a high level and it becomes low level during the period when both of the U and U' are at a low level.

In the phase difference detection signal V, a direct current average value Vp shown by a broken line is extracted by the filter 25d.

As the phase comparator 25c, not only the EX-OR type but also a flip flop may be used.

In this case, the general flip flop requires another input of a clock signal in addition to the above input signal.

The output voltage Vp from the phase comparison unit 25 is converted into a digital value by the analog/digital (A/D) converter 26 to be input to the controller section 30.

The controller section 30 includes an initializing unit 30a, a calibration unit 30b, a phase controlling unit 30c, and a sin/cos table 30d described below.

FIG. 1C is a view for use in describing the contents of the sin/cos table 30d used in the controller section 30 which forms the feedback control circuit in the phase controller apparatus 20 according to the first embodiment of the invention.

As shown in FIG. 1C, the sin/cos table 30d stores the direct current voltages Vi and Vq indicated by the sine value/cosine value as the digital data, corresponding to the set value D of the desired phase delay set by the setting unit 31 arbitrarily in the range of 0 to π to 2π, for example, at the intervals of 0.000200 UI when the unit is a unit interval UI.

The controller section 30 receives the set value of the desired phase delay D set by the setting unit 31, reads out the serial voltages Vi and Vq corresponding to the set value D from the sin/cos table 30d, supplies them to the quadrature modulator 22 through the D/A converter 32, and variably controls the direct current voltages Vi and Vq so that the output voltage Vp of the phase comparison unit 25 may become the value corresponding to the set value D.

When the set value (0 to 2π) of the desired phase delay D is set by the setting unit 31, as mentioned above, the controller section 30 reads out the sine value and the cosine value for giving the direct current voltages Vi and Vq corresponding to the set value of the desired phase delay D from the sin/cos table 30d, and supplies them to the quadrature modulator 22 through the D/A converter 32. The feedback control circuit including the phase comparison unit 25 and the controller section 30 is driven so to variably control the direct current voltages Vi and Vq so that the output voltage Vp of the phase comparison unit 25 may become the value corresponding to the set value of the desired phase delay D.

Owing to this function of the feedback control circuit, the second signal C' finally output from the phase controller apparatus 20 is compensated for the phase error caused by the effect of the quadrature error in the quadrature modulator 22 and the offset error.

The controller section 30 has a function for detecting the frequency of the first signal C and performs the setting processing of selecting the first filter block 21 or the second filter block 23 according to the detected frequency f.

Hereinafter, an outline of the processing of the controller section 30 will be described.

Figure 2:
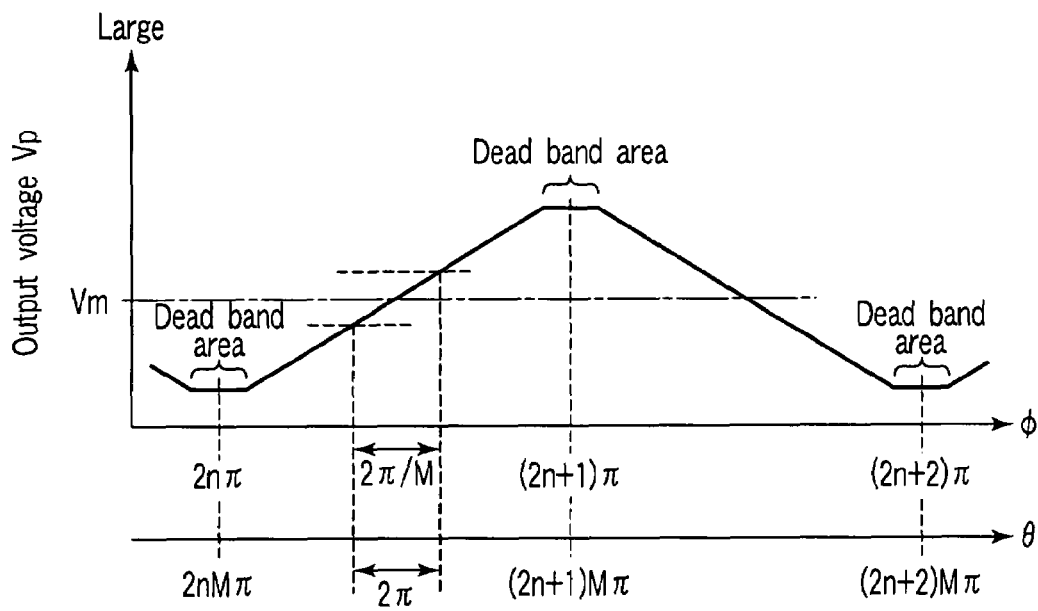
FIG. 2 is a view for use in describing characteristics of an important part in the phase controller apparatus according to the first embodiment of the invention.

FIG. 2 is a view for use in describing the characteristics of an important part of the phase controller apparatus in the first embodiment according to the invention.

Specifically, FIG. 2 shows the relation among the phase difference $\phi$ between the dividing signals U and U', the phase difference $\phi$ between the signals C and C', and the output voltage Vp of the phase comparison unit 25.

As shown in FIG. 2, according to an increase of the phase difference $\phi$ between the dividing signals U and U', the output voltage Vp increases linearly and monotonously in the period during which the dividing signals U and U' change from a substantially in-phase ($\phi=2 n\pi$, n=0, 1, . . . ) to a substantially reversed phase ($\phi=(2 n+1)\pi$).

On the contrary, as shown in FIG. 2, the output voltage Vp decreases linearly and monotonously in the period during which the dividing signals U and U' change from the substantially reversed phase ($\phi=(2 n+1)\pi$) to the substantially in-phase ($\phi=(2 n+2)\pi$).

As shown in FIG. 2, dead band zones appear in the vicinity of the in-phase ($\phi=2 n\pi$, n=0, 1, . . . ) and the reversed phase ($\phi=(2 n+1)\pi$) as for the phase difference $\phi$ between the both signals U and U'.

On the other hand, the phase difference $\theta$ between the both signals C and C' has the relation of $\theta=M\cdot\phi$. Since the area in which the phase difference $\theta$ varies $\pm\pi$ is compressed to 1/M by the dividing, the area where the phase difference $\theta$ varies by $2\pi$ ($\phi$ varies by $2\pi/M$) around the center voltage Vm in the monotonously increasing area, as illustrated in FIG. 2, is used as the detection operational area, thereby avoiding the dead band zones at the time of detecting the phase.

However, as mentioned above, the phase comparison unit 25 includes the first frequency divider 25a and the second frequency divider 25b and their rising/falling edges of the output signals of the both frequency dividers 25a and 25b are determined at some timing of the M cases similar to the dividing ratio M in every startup of the apparatus.

Then, the controller section 30 resets the two frequency dividers 25a and 25b so as to fix the detection operational area at the center of the monotonously increasing area, in order that the initial setting unit 30a may determine the rising/falling edges of the output signals of the two frequency dividers 25a and 25b at the startup-time of the apparatus.

Figure 3:
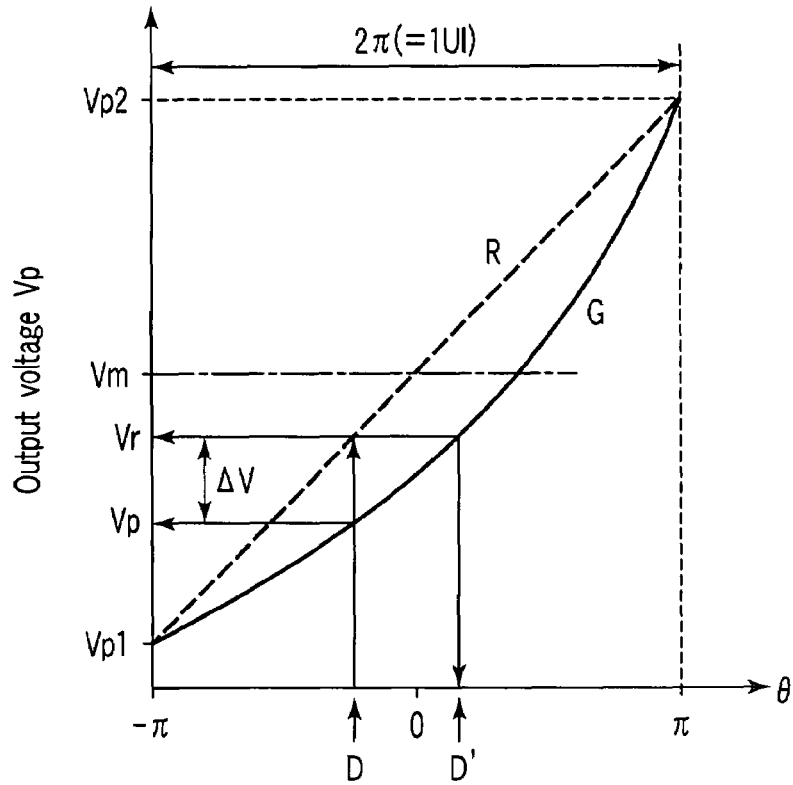
FIG. 3 is a view showing one portion of FIG. 2 in an enlarged way for use in describing the characteristics of the important part in the phase controller apparatus according to the first embodiment of the invention.

FIG. 3 is a view showing one portion of FIG. 2 in an enlarged way for describing the characteristics of the important part of the phase controller apparatus according to the first embodiment of the invention.

Specifically, FIG. 3 shows the area in which the phase difference $\theta$ between the both signals C and C' in FIG. 2 varies by $2\pi$(1 UI) of $0\pm\pi$ ($0\pm0.5$ UI) in an enlarged way.

As shown in FIG. 3, when the phase difference $\theta$ varies from $-\pi$ ($-0.5$ UI) to $\pi$ (0.5 UI), in spite of the output voltage Vp monotonously increasing from Vp1 to Vp2, the change characteristic G does not necessarily agree with a straight line R (an original characteristic of the phase comparison unit 25) of a regular gradient owing to the error of the quadrature modulator 22.

Since the change amount of the phase difference $\theta$ after the voltage of the change characteristic G varies from Vp1 to Vp2 is $2\pi$, the characteristic G crosses the straight line R at the time of the output voltages Vp1 and Vp2.

In the controller section 30, after the initialization processing by the initializing unit 30a, the calibration unit 30b obtains the above output voltages Vp1 and Vp2 and the following formula representing the straight line R (theoretical characteristic formula) showing the characteristic of the phase comparison unit 25

$$Vr=(Vp2-Vp1)\theta+(Vp1+Vp2)/2$$

(where, the unit $\theta$ is UI).

After the calibration unit 30b finishes the processing, the phase controlling unit 30c variably controls the direct current voltages Vi and Vq to be given to the quadrature modulator 22 so that the voltage Vp actually output from the phase comparison unit 25 may be equal to the output reference value Vr obtained by the desired phase delay D specified by the setting unit 31 and the theoretical characteristic formula (within the range of allowance) and obtains the second signal C' having the desired phase delay D.

Hereinafter, a specific processing procedure of the controller section 30 will be described.

Figure 4:
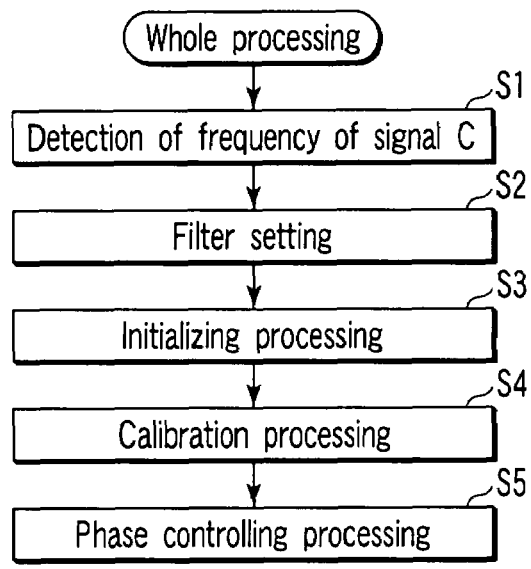
FIG. 4 is a flow chart for use in describing a processing procedure of the important part in the phase controller apparatus according to the first embodiment of the invention.

FIG. 4 is a flow chart for use in describing a processing procedure of the important part of the phase controller apparatus according to the first embodiment the invention.

At first, the whole processing by the controller section 30 will be described.

As shown in FIG. 4, the controller section 30 detects the frequency f of the first signal C at the startup of the apparatus (at the time of putting on a power source) (Step S1).

Next, the controller section 30 performs the select setting processing of the first filter block 21 and the second filter block 23 (Step S2) based on the frequency f of the first signal C detected in Step S1.

In Step S3, the controller section 30 performs the initializing processing in the initializing unit 30a.

After the calibration unit 30b performs the calibration processing in Step S4, the controller section 30 performs the controlling processing on the determined desired phase delay D in the phase controlling unit 30c in Step S5.

Figure 5:
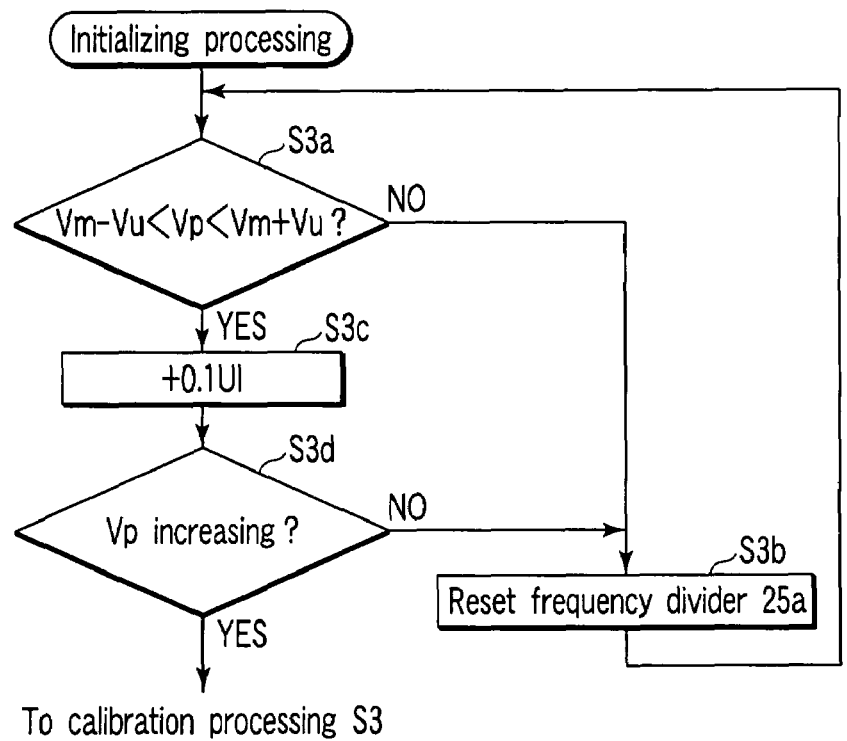
FIG. 5 is a flow chart for use in describing a processing procedure of the important part in the phase controller apparatus according to the first embodiment of the invention.

As shown in FIG. 5, in the initialization processing step S3 by the initializing unit 30a of the controller section 30, a phase difference between the dividing signals U and U' generated by a difference of the internal initial condition between the both frequency dividers 25a and 25b is cancelled and the output voltage Vp of the phase comparison unit 25 is arranged within the voltage range Vm±Vu set around the central voltage Vm as well as in the range of monotonous increase.

FIG. 5 is a flow chart for use in describing a processing procedure of the initializing processing step S3, as the processing procedure of the important part of the phase controller apparatus according to the first embodiment of the invention.

As shown in FIG. 5, the controller section 30 checks whether the output voltage Vp of the phase comparison unit 25 is in the range of Vm±Vu or not in this initialization processing step S3, resets the first frequency divider 25a (or the second frequency divider 25b) when the voltage Vp is not in the range, and again checks the output voltage Vp of the phase comparison unit 25 repeatedly (Steps S3a and S3b).

As shown in FIG. 5, the controller section 30 increases the phase difference between the dividing signals U and U', for example, by 0.1 UI, in the state in which the output voltage Vp of the phase comparison unit 25 is in the range of Vm±Vu in the initialization processing step S3 and checks whether the output voltage Vp of the phase comparison unit 25 at that time increases or decreases (Step S3c).

The controller section 30 performs the reset processing of the first frequency divider 25a when the voltage Vp decreases in Step S3c and controls the output voltage Vp of the phase comparison unit 25 to be within the range of Vm±Vu as well as in the monotonous increasing range (Step S3d).

The calibration processing step S4 by the calibration unit 30b in the controller section 30 is to determine the above theoretical characteristic formula (the formula of the straight line R) in a procedure shown in FIG. 6 described below.

Figure 6:
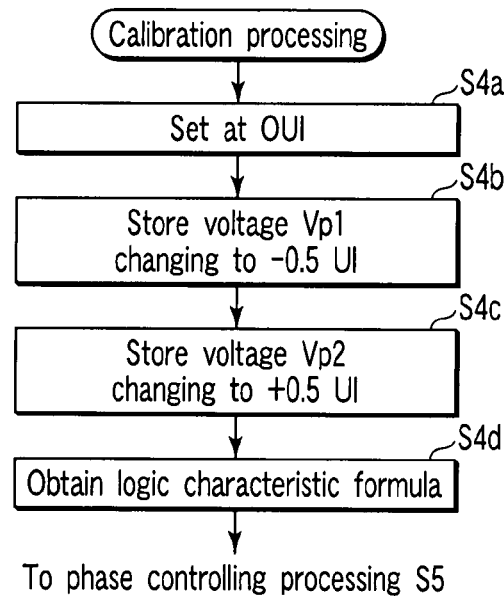
FIG. 6 is a flow chart for use in describing a processing procedure of the important part in the phase controller apparatus according to the first embodiment of the invention.

FIG. 6 is a flow chart for use in describing a processing procedure for determining the theoretical characteristic formula, as the processing procedure of the important part of the phase controller apparatus according to the first embodiment of the invention.

As shown in FIG. 6, the controller section 30 sets the direct current voltages Vi and Vq to be given to the quadrature modulator 22, corresponding to the value when the phase difference between the dividing signals U and U' becomes 0 UI, in the calibration processing step S4 (Step S4a).

Next, the controller section 30 changes the direct current voltages Vi and Vq to be given to the quadrature modulator 22 until the phase difference between the dividing signals U and U' becomes −0.5 UI and stores the output voltage Vp1 of the phase comparison unit 25 at this time (Step S4b).

The controller section 30 changes the direct current voltages Vi and Vq to be given to the quadrature modulator 22 until the phase difference between the dividing signals U and U' becomes 0.5 UI and stores the output voltage Vp2 of the phase comparison unit 25 at this time (Step S4c).

The controller section 30 determines the theoretical characteristic formula (the formula of the straight line R) based on the output voltages Vp1 and Vp2 of the phase comparison unit 25 (Step S4d).

Figure 7:
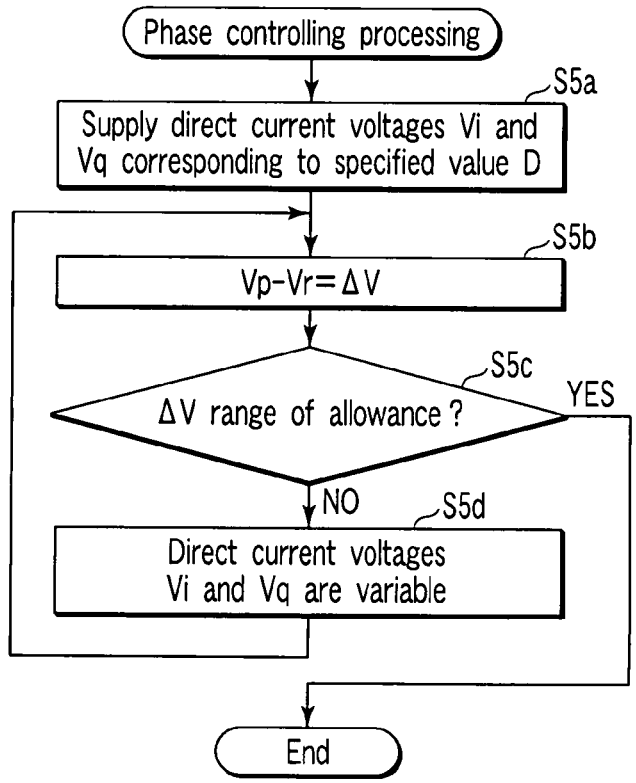
FIG. 7 is flow chart for use in describing a processing procedure of the important part in the phase controller apparatus according to the first embodiment of the invention.

FIG. 7 is a flow chart for use in describing a processing procedure of phase controlling processing step S5, as the processing procedure of the important part of the phase controller apparatus according to the first embodiment of the invention.

As shown in FIG. 7, the controller section 30 supplies the direct current voltages Vi and Vq corresponding to the desired phase delay D set by the setting unit 31 to the quadrature modulator 22, in the phase control processing step S5 by the phase controlling unit 30c (Step S5a).

As shown in FIG. 3, the controller section 30 obtains a difference ΔV generated between the output voltage Vp of the phase comparison unit 25 and the output reference value Vr obtained by assigning the phase delay D to the theoretical characteristic formula (Step S5b).

Next, the controller section 30 variably controls (run-on control) the direct current voltages Vi and Vq given to the quadrature modulator 22 so that the difference ΔV may be within the predetermined range of allowance (Steps S5c and S5d).

Owing to the phase control processing, the direct current voltages Vi and Vq given to the quadrature modulator 22 finally becomes the value corresponding to the phase delay D' of FIG. 3. Therefore, the phase error generated by the quadrature modulator 22 is cancelled.

Owing to the above processing, it is possible to give the desired phase delay D which is set by the setting unit 31 to the second signal C' output from the phase controller apparatus 20 finally, free from effect of the error in the quadrature modulator 22.

Figure 8:
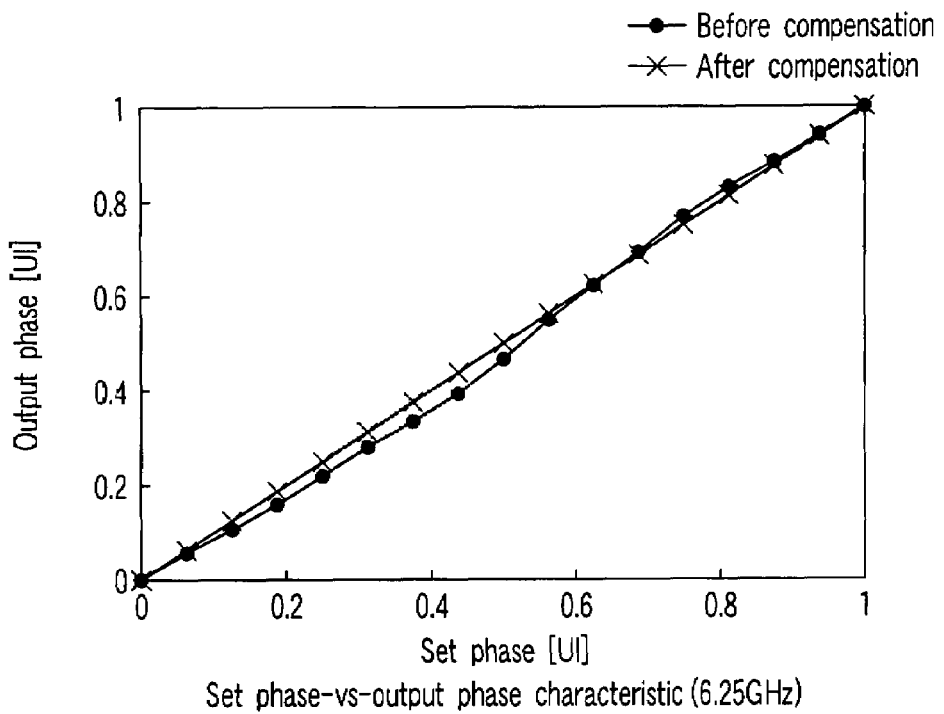
FIG. 8 is a view showing the characteristics of a set phase-vs-output phase in comparison between before compensation and after compensation, in the phase controller apparatus according to the first embodiment of the invention.

FIG. 8 is a view showing the characteristics of a set phase-vs-output phase in comparison between before compensation and after compensation by the feedback control circuit including the phase comparison unit 25 and the controller section 30, in the phase controller apparatus 20 according to the first embodiment of the invention.

Specifically, FIG. 8 shows a measured result of the set phase-vs-output phase obtained as for the first signal C having the frequency of 6.25 GHz, in the comparison between before compensation and after compensation by the feedback control circuit including the phase comparison unit 25 and the controller section 30, in the phase controller apparatus 20 according to the first embodiment.

Figure 9:
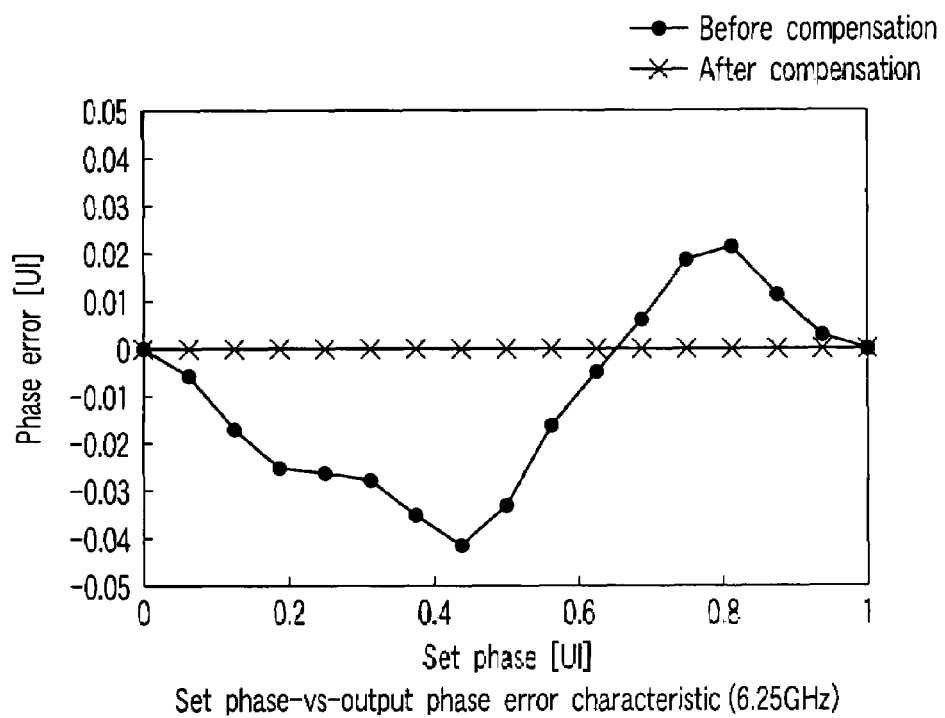
FIG. 9 is a view showing the characteristics of errors between a set phase-vs-output phase error in comparison between before compensation and after compensation, in the phase controller apparatus according to the first embodiment of the invention.

FIG. 9 is a view showing the characteristics of a set phase-vs-output phase error in comparison between before compensation and after compensation by the feedback control circuit including the phase comparison unit 25 and the controller section 30, in the phase controller apparatus 20 according to the first embodiment of the invention.

Specifically, FIG. 9 shows the error components of FIG. 8. From FIG. 9, it is found that a substantially linear characteristic is obtained after compensation, compared with the case in which the phase control is not performed by the feedback control circuit including the phase comparison unit 25 and the controller section 30 (before compensation).

In the embodiment, it is possible to change the phase difference θ corresponding to the desired phase delay D given to a target signal for phase control beyond the range of $2\pi$.

In this case, the phase is changed at a small step (for example, $\pi/4$ or less) to approach a target phase. When the difference to the target phase becomes less than this step, the phase is changed at the smaller step for this difference, hence to agree with the phase corresponding to the desired phase delay D.

Figure 1D:
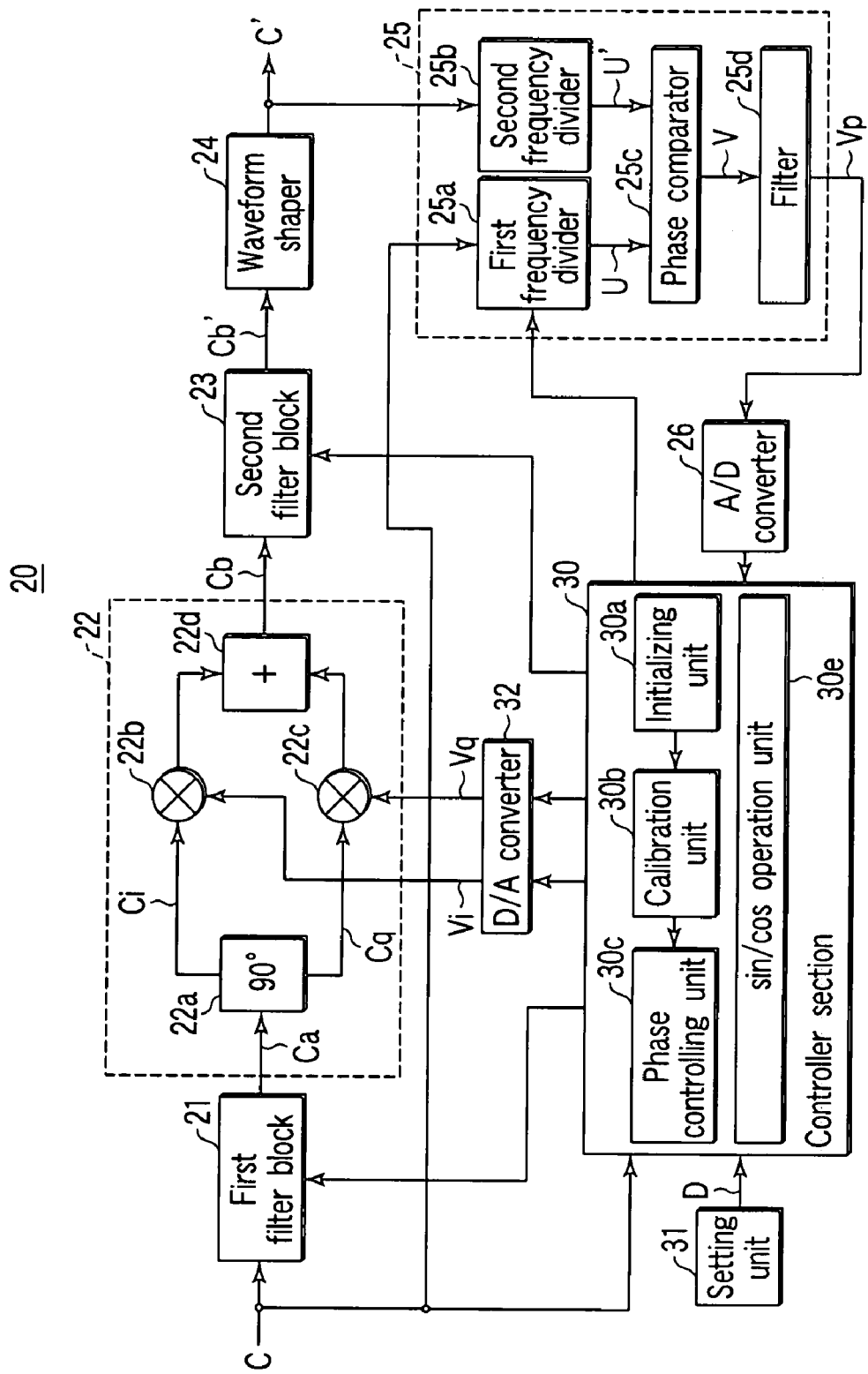
FIG. 1D is a block diagram showing the structure of a modification example using a sin/cos operation unit 30e in the controller section 30 which forms the feedback control circuit in the phase controller apparatus 20 according to the first embodiment of the invention.

FIG. 1D is a block diagram showing the structure of a modification example of using a sin/cos operation unit 30e in the controller section 30 which forms the feedback control circuit in the phase controller apparatus 20 according to the first embodiment of the invention.

In the modification example, a sin/cos (trigonometric function) operation unit 30e is included in the controller section 30, instead of the sin/cos table 30d.

In the modification example, the sin/cos (trigonometric function) operation unit 30e is used to calculate the direct current voltages Vi and Vq indicated by the sine value/cosine value corresponding to the set value of the desired phase delay D set by the setting unit 31 arbitrarily, for example, in the range of 0 to $\pi$ to $2\pi$ at intervals of 0.000200 UI when the unit is a unit interval UI.

SECOND EMBODIMENT

FIG. 10A is a block diagram showing the structure when a phase controller apparatus 20' according to a second embodiment of the invention controls the phase of a sine wave signal.

In FIG. 10A, the same reference numerals as those of FIG. 1A are attached to the same components as the phase controller apparatus 20 according to the first embodiment and their description is omitted.

The first embodiment is about the phase controller apparatus 20 which gives the phase delay to the first signal C of rectangular wave signal such as a clock signal and outputs it.

On the other hand, the phase controller apparatus 20' according to the second embodiment shown in FIG. 10A controls the phase of the first signal C and the second signal C' of sine wave signal.

In this case, in the phase controller apparatus 20' shown in FIG. 10A, since the first signal C of sine wave signal is input to the phase controller apparatus 20', the first filter block 21 and the waveform shaper 24 used for the first embodiment are omitted and only a filter block 23 corresponding to the second filter block 22 is used.

In the phase controller apparatus 20' according to the second embodiment shown in FIG. 10A, the error of the quadrature modulator 22 is small and the filter block 23 may be omitted when a spurious component included in the output signal is small.

Figure 10B:
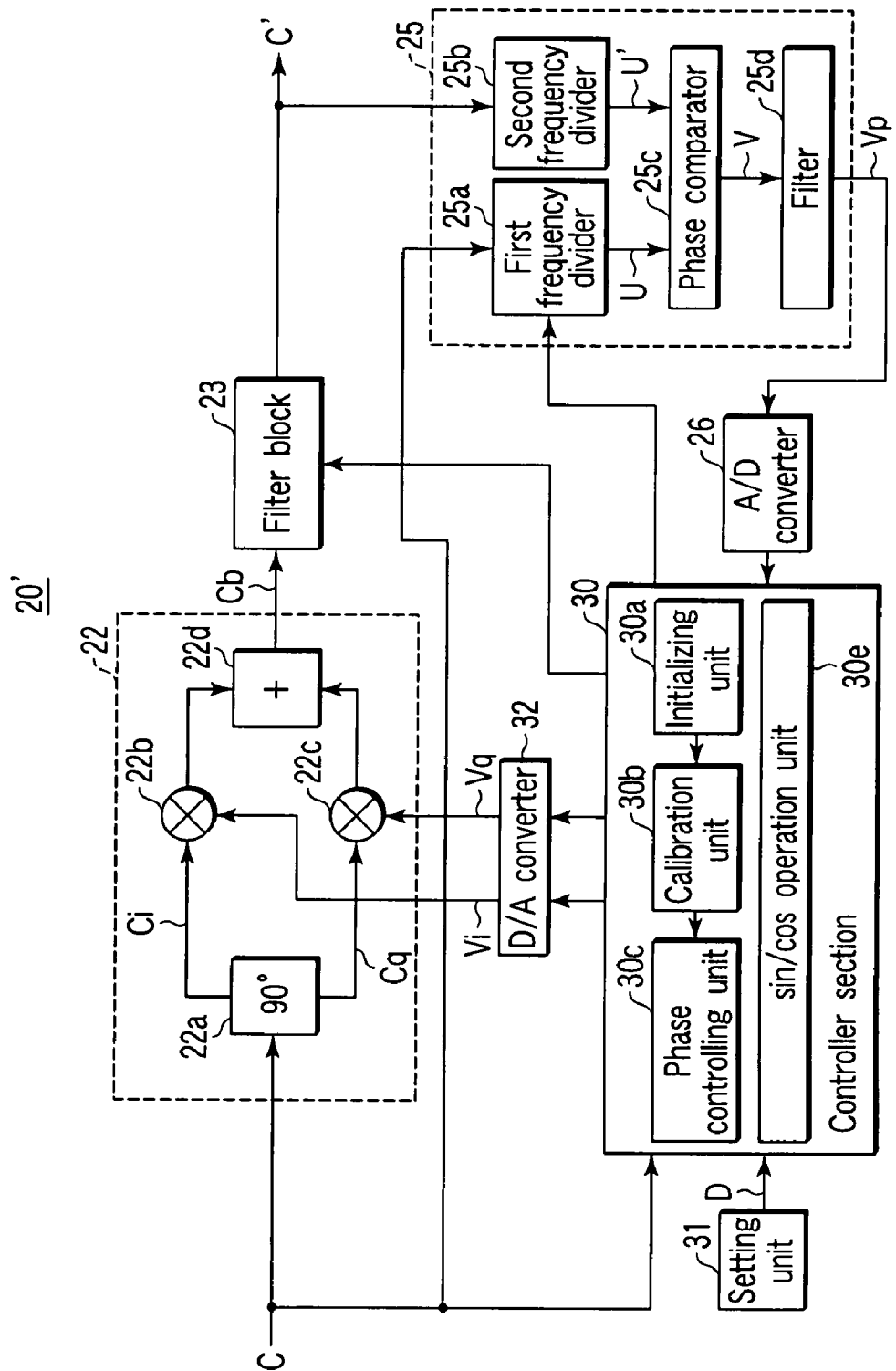
FIG. 10B is a block diagram showing the structure of a modification example when the phase controller apparatus according to the second embodiment of the invention controls the phase of the sine wave signal.

FIG. 10B is a block diagram showing the structure of a modification example when the phase controller apparatus 20' according to the second embodiment of the invention controls the phase of a sine wave signal.

In the modification example, the sin/cos (trigonometric function) operation unit 30e is included in the controller section 30, instead of the sin/cos table 30d, similarly to the case of FIG. 1D.

In this modification example, the sin/cos (trigonometric function) operation unit 30e is used to calculate the direct current voltages Vi and Vq indicated by the sine value/cosine value corresponding to the set value of the desired phase delay D set by the setting unit 31 arbitrarily in the range of 0 to $\pi$ to $2\pi$, for example, at the intervals of 0. 000200 UI when the unit is a unit interval UI, similarly to the case of FIG. 1D.

THIRD EMBODIMENT

Figure 10C:
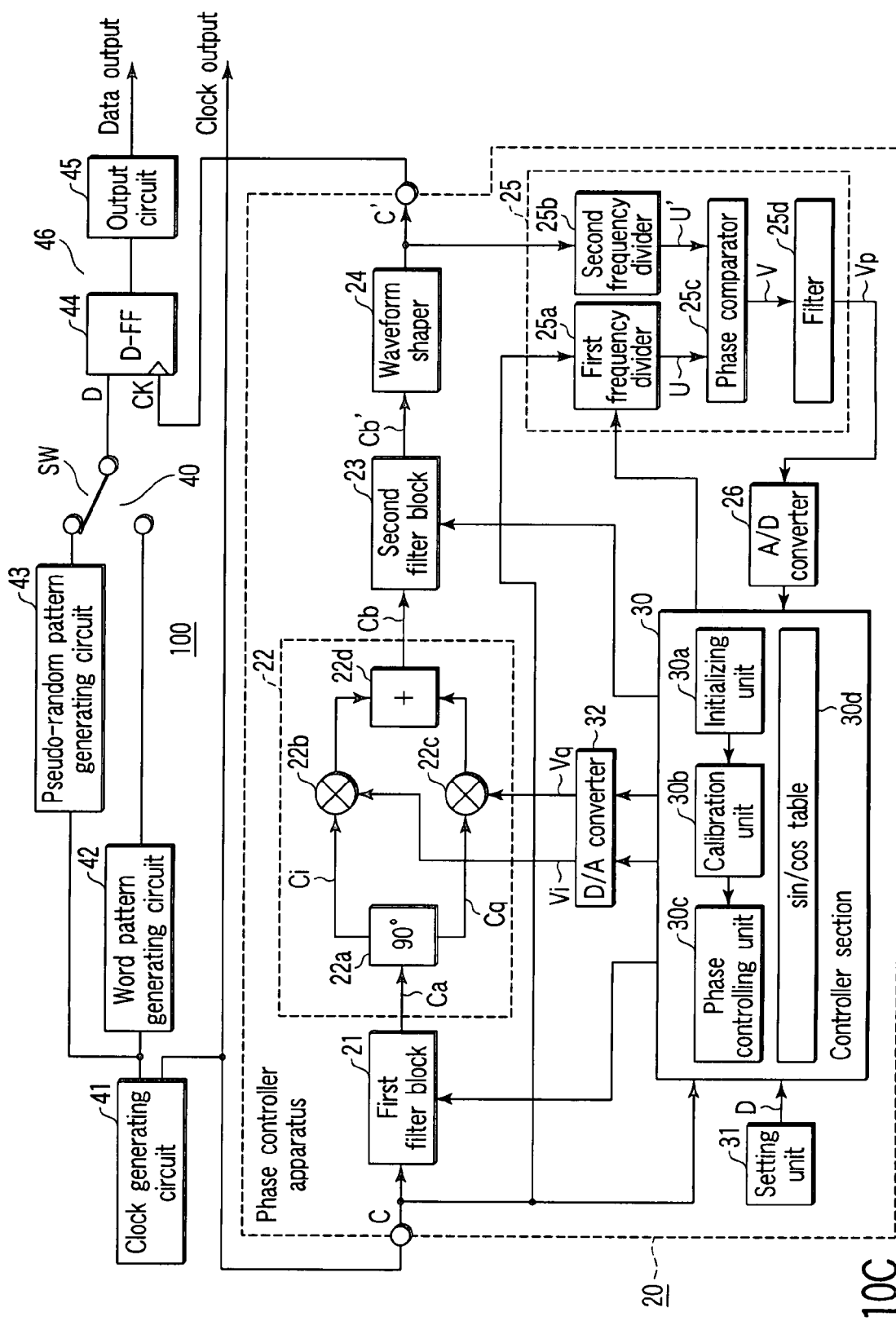
FIG. 10C is a block diagram showing the structure of a pulse pattern generator using the phase controller apparatus according to the first embodiment, as a third embodiment according to the invention.

FIG. 10C is a block diagram showing the structure of a pulse pattern generator 100 using the phase controller apparatus 20 according to the first embodiment as a third embodiment of the invention.

In FIG. 10C, the same reference numerals as those in FIG. 1A are attached to the same components as the phase controller apparatus 20 according to the first embodiment and their description is omitted.

The pulse pattern generator 100 shown in FIG. 10C basically includes: a pulse pattern generating unit 40 which generates a desired pulse pattern signal; the phase controller apparatus 20 which controls a phase difference between the desired pulse pattern signal from the pulse pattern generating unit 40 and a clock signal; and a pulse pattern output unit 46 which outputs the desired pulse pattern signal supplied from the pulse pattern generating unit 40 with a predetermined correction applied to the above signal whose phase difference with the clock signal is controlled by the phase controller apparatus 20.

As a basic structure, the phase controller apparatus 20 further comprises: a quadrature modulator 22 which divides the first signal C being the clock signal input as a local signal into the I channel signal Ci and the Q channel signal Cq orthogonal to each other and supplies the second signal C' having the desired phase delay D corresponding to the direct current voltages Vi and Vq as for the first signal C by giving the direct current voltages Vi and Vq to the I channel signal Ci and the Q channel signal Cq respectively; a phase comparison unit 25 which detects a phase difference $\theta$ between the first signal C input to the quadrature modulator 22 and the second signal C' output from the quadrature modulator 22; a setting unit 31 for setting the desired phase delay D; and a controller section 30 which controls the direct current voltages Vi and Vp given to the I channel signal Ci and the Q channel signal Cq respectively in the quadrature modulator 22 so that the output value corresponding to the phase difference $\theta$ detected by the phase comparison unit 25 may be equal to the value corresponding to the desired phase delay D set by the setting unit 31 and controls the direct current voltages Vi and Vp so as to satisfy the relation, Vi=cos $\theta$ and Vq=sin $\theta$.

Specifically, as shown in FIG. 10C, the pulse pattern generating unit 40 includes: a clock generating unit 41 which generates a clock signal of rectangular wave which varies in the range of frequency, for example, 100 MHz to 10 GHz; a word pattern generating unit 42 which generates a word pattern signal based on the clock signal output from the clock generating unit 41; a pseudo-random pattern generating unit 43 which generates a pseudo-random pattern signal based on the clock signal output from the clock generating unit 41; and a switch SW which switches the word pattern signal output from the word pattern generating unit 42 and the pseudo-random pattern signal output from the pseudo-random pattern generating unit 43, hence to output the desired pulse pattern signal.

The pulse pattern output unit 46 includes: a D-flip flop (D-FF) 44 which receives the desired pulse pattern signal from the switch SW at its data input end D and also receives the second signal C' having the desired phase delay D, corresponding to the predetermined direct current voltages Vi and Vq, from the first signal C output from the phase controller apparatus 20 at its clock input end CK, hence to output the desired pulse pattern signal phase-controlled with the clock signal from the clock generating unit 41 by the phase controller apparatus 20; and an output circuit 45 which applies an amplitude correction to the phase-controlled desired pulse pattern signal supplied from the D-flip flop (D-FF) 44 and also applies a direct current (DC) offset correction, to output as a data output.

The clock signal from the clock generating unit 41 is output to the outside as a clock output together with the data output.

FIG. 10D is a block diagram showing the structure of the pulse pattern generator 100 using the phase controller apparatus 20 according to the modification example of the first embodiment as a modification example according to the third embodiment of the invention.

In FIG. 10D, the same reference numerals as those of FIGS. 1D and 10C are attached to the same components as the phase controller apparatus 20 according to the modification example of the first embodiment and the pulse pattern generator 100 according to the third embodiment and their description is omitted.

FOURTH EMBODIMENT

Figure 10E:
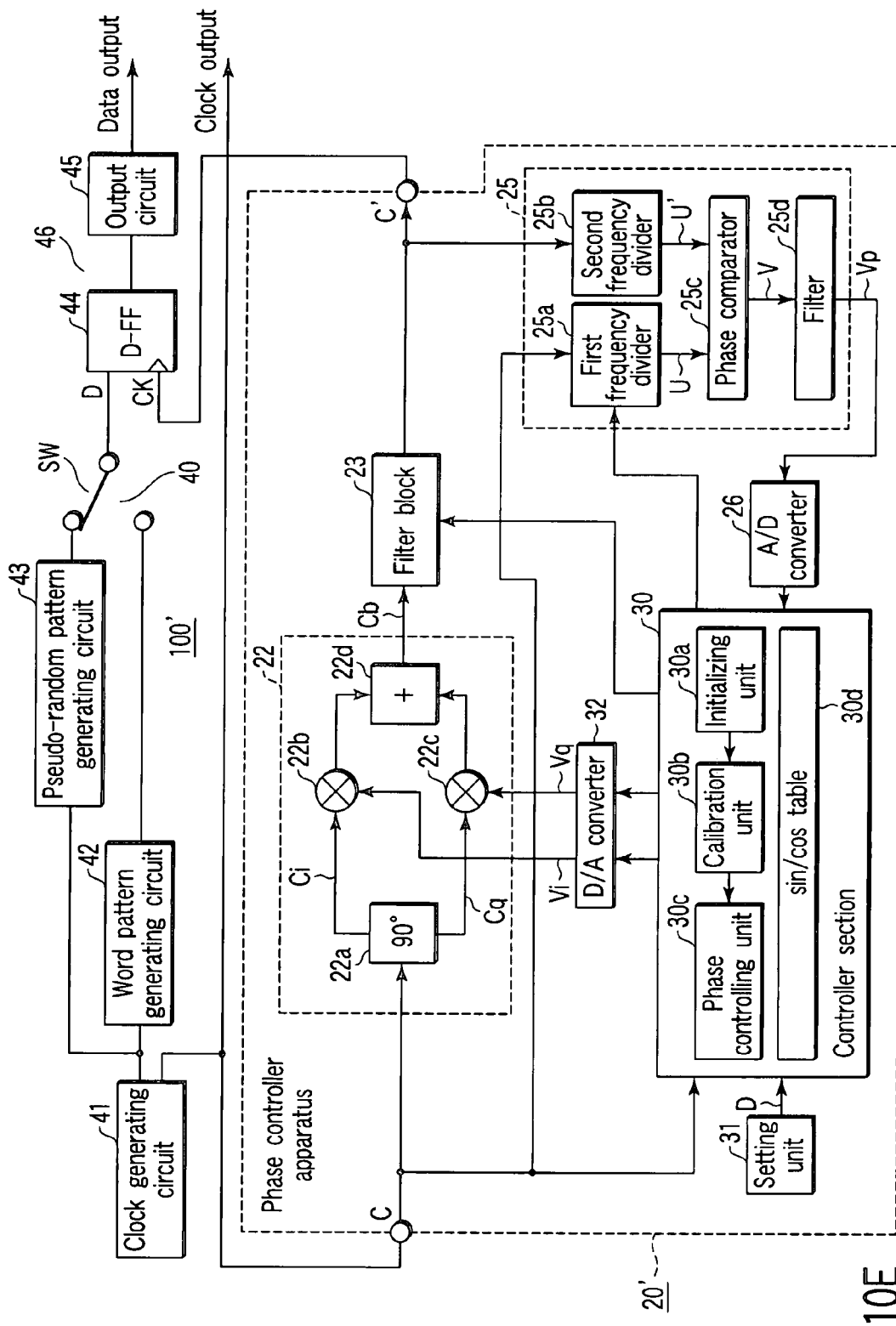
FIG. 10E is a block diagram showing the structure of a pulse pattern generator using the phase controller apparatus according to the second embodiment, as a fourth embodiment according to the invention.

FIG. 10E is a block diagram showing the structure of a pulse pattern generator 100' using the phase controller apparatus 20' according to the second embodiment as a fourth embodiment of the invention.

In FIG. 10E, the same reference numerals as those of FIGS. 10A and 10C are attached to the same components as the phase controller apparatus 20' according to the second embodiment and the pulse pattern generator 100 according to the third embodiment and their description is omitted.

FIG. 10F is a block diagram showing the structure of the pulse pattern generator 100' using the phase controller apparatus 20' according to the modification example of the second embodiment as a modification example according to the fourth embodiment of the invention.

In FIG. 10F, the same reference numerals as those of FIGS. 10B and 10C are attached to the same components as the phase controller apparatus 20' according to the modification example of the second embodiment and the pulse pattern generator 100 according to the third embodiment and their description is omitted.

FIFTH EMBODIMENT

Figure 10G:
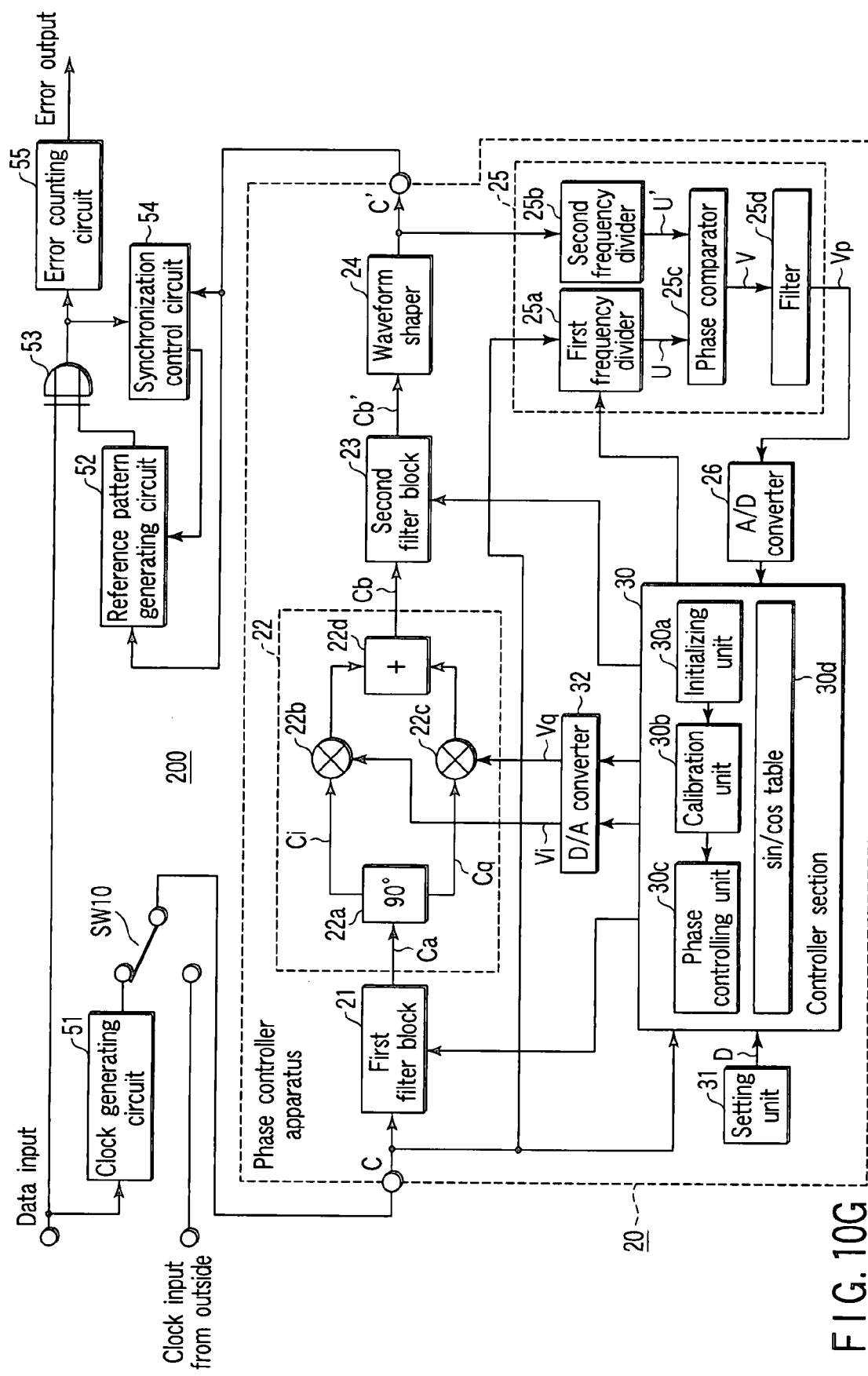
FIG. 10G is a block diagram showing the structure of an error detector using the phase controller apparatus according to the first embodiment, as a fifth embodiment according to the invention.

FIG. 10G is a block diagram showing the structure of an error detector 200 using the phase controller apparatus 20 according to the first embodiment as a fifth embodiment of the invention.

In FIG. 10G, the same reference numerals as those of FIG. 1A are attached to the same components as the phase controller apparatus 20 according to the first embodiment and their description is omitted.

The error detector 200 shown in FIG. 10G basically comprises: a phase controller apparatus 20 which controls the phase of the clock signal C input from the outside; a reference pattern generating circuit 52 which generates a desired reference pattern signal based on the clock signal C' phase-controlled by the phase controller apparatus 20; an Exclusive-OR circuit (EX-OR) 53 which compares a signal to be error-detected as the data input signal input from the outside with a desired reference pattern signal supplied from the reference pattern generating circuit 52 by the unit of bit and outputs a bit error signal; a synchronization control circuit 54 which controls the phase of a synchronization signal for making the output timing of the reference pattern signal output from the reference pattern generating circuit 52 based on the bit error signal supplied from the Exclusive-OR circuit (EX-OR) 53 and the clock signal C' phase-controlled by the phase controller apparatus 20 agree with the timing of the error-detected signal input from the outside by the unit of bit; and an error counting circuit 55 which counts the bit error signal from the Exclusive-OR circuit (EX-OR) 53 and outputs it.

The phase controller apparatus 20 basically includes: a quadrature modulator 22 which divides the first signal C being the clock signal input as a local signal from the outside into the I channel signal Ci and the Q channel signal Cq orthogonal to each other and outputs the second signal C' having a desired phase delay D corresponding to the direct current voltages Vi and Vq as for the first signal C by giving the direct current voltages Vi and Vq to the I channel signal Ci and the Q channel signal Cq respectively; a phase comparison unit 25 which detects a phase difference θ between the first signal C input to the quadrature modulator 22 and the second signal C' output from the quadrature modulator 22; a setting unit 31 which sets the desired phase delay D; and a controller section 30 which controls the direct current voltages Vi and Vp given to the I channel signal Ci and the Q channel signal Cq respectively in the quadrature modulator 22 so that the output value corresponding to the phase difference θ detected by the phase comparison unit 25 may be equal to the value corresponding to the desired phase delay D set by the setting unit 31 and controls the direct current voltages Vi and Vq to satisfy the relation Vi=cos θ and Vq=sin θ.

Specifically, the error detector 200 shown in FIG. 10G further includes: a clock generating circuit 51 which reproduces the clock signal of rectangular wave included in the error-detected signal as the data input signal input from the outside and outputs it; and a switch SW 10 which switches the clock signal from the clock generating circuit 51 and the clock signal from the outside and outputs the clock signal to the phase controller apparatus 20 as the first signal C which is input as the local signal.

When it is difficult for the clock generating circuit 51 to reproduce the clock signal of rectangular wave included in the error-detected signal as the data input signal, the clock signal from the outside is used.

Similarly to the pulse pattern generating unit 40 of the pulse pattern generator 100 shown in FIG. 10C, the reference pattern generating circuit 52 includes: a word pattern generating unit 42 which generates a word pattern signal based on the clock signal; a pseudo-random pattern generating unit 43 which generates the pseudo-random pattern signal based on the clock signal; and a switch SW which switches the word pattern signal from the word pattern generating unit 42 and the pseudo-random pattern signal from the pseudo-random pattern generating unit 43 and outputs a desired reference pattern signal.

While controlling the phase of the synchronization signal based on the bit error signal from the EX-OR 53, the synchronization control circuit 54 controls the output timing of the desired reference pattern signal output from the reference pattern generating circuit 52 so that the EX-OR 53 may compare each bit of the error-detected signal input from the outside with each bit of the desired reference pattern signal output from the reference pattern generating circuit 52 sequentially in order: the first bit of the error-detected signal with the first bit of the reference pattern signal; the second bit, the third bit, . . . of the error-detected signal with the second bit, the third bit, . . . of the reference pattern signal respectively.

When two inputs disagree with each other by the unit of bit (for example, the error-detected signal is 1 and the desired reference pattern signal is 0), the EX-OR 53 outputs 1 as the bit error signal and when the two inputs agree with each other (for example, the error-detected signal is 1 and the desired reference pattern signal is 1), it outputs 0 as the bit error signal.

Therefore, the error counting circuit 55 counts the bit error signal supplied from the EX-OR 53, thereby detecting the number of bit error signals in the error-detected signal.

FIG. 10H is a block diagram showing the structure of the error detector 200 using the phase controller apparatus 20 according to the modification example of the first embodiment as a modification example of the fifth embodiment of the invention.

In FIG. 10H, the same reference numerals as those of FIGS. 1D and 10G are attached to the same components as the phase controller apparatus 20 according to the modification example of the first embodiment and the error detector 200 according to the fifth embodiment and their description is omitted.

SIXTH EMBODIMENT

Figure 10I:
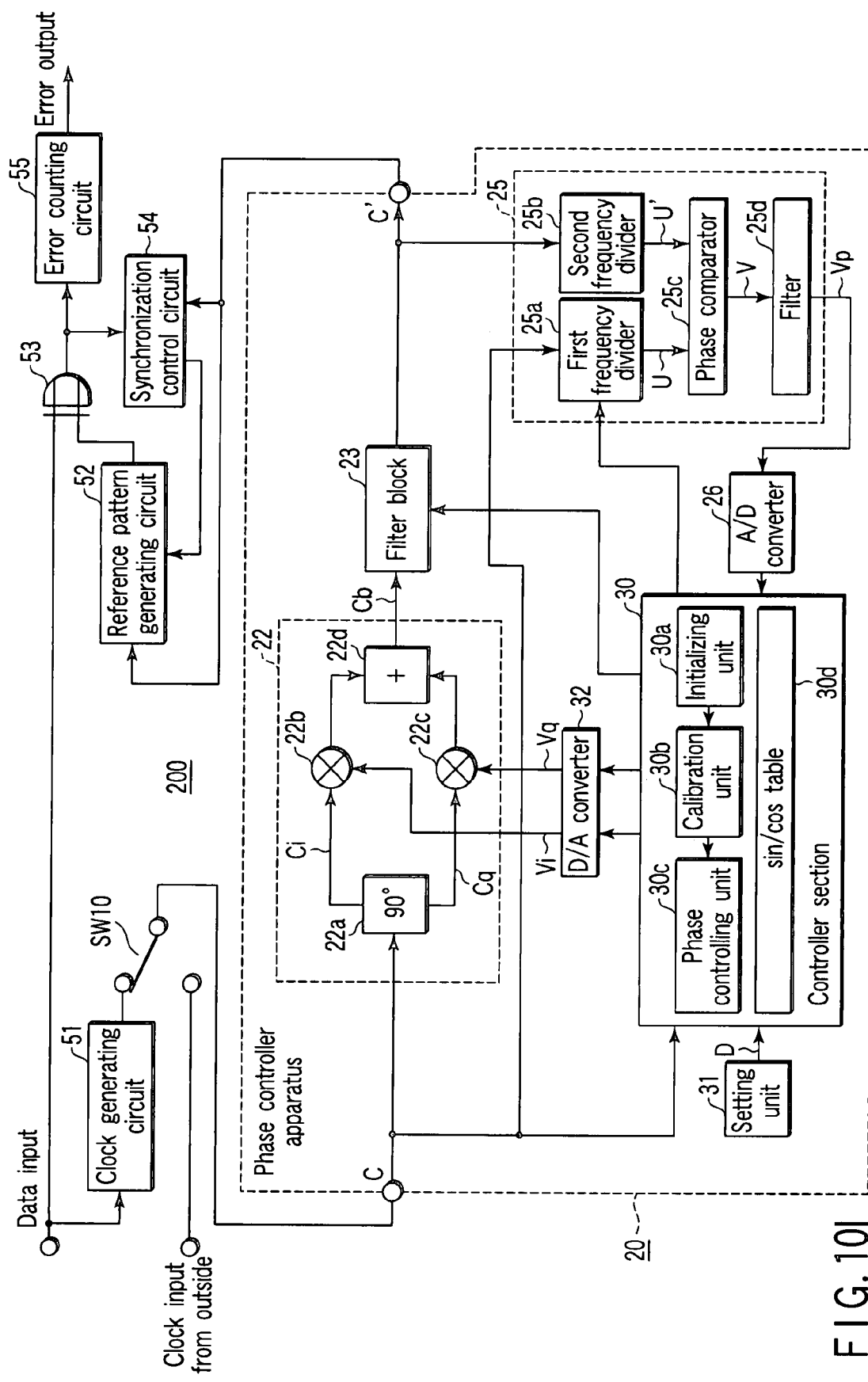
FIG. 10I is a block diagram showing the structure of an error detector using the phase controller apparatus according to the second embodiment, as a sixth embodiment according to the invention.
Figure 11A:
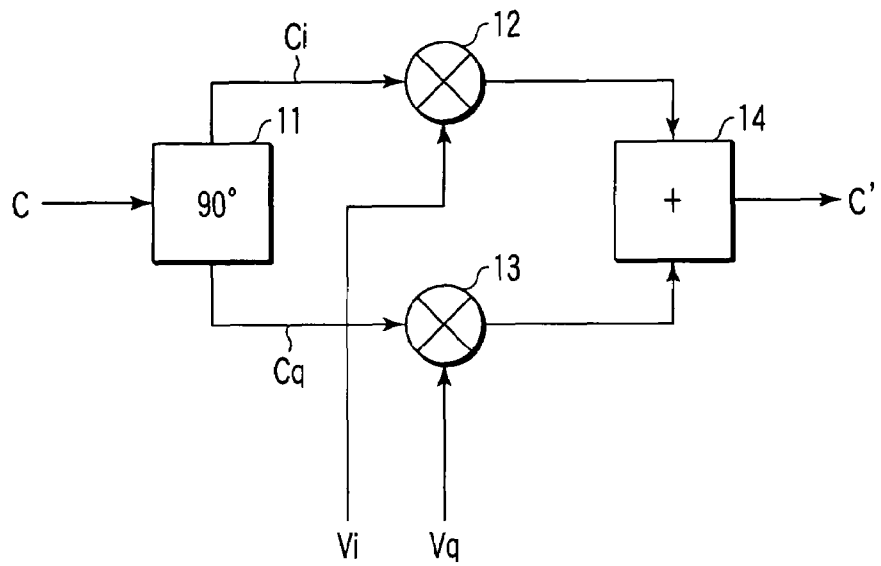
FIG. 11A is a block diagram showing the structure when a quadrature modulator is used to delay a signal as a phase controller apparatus according to the conventional art.
Figure 11B:
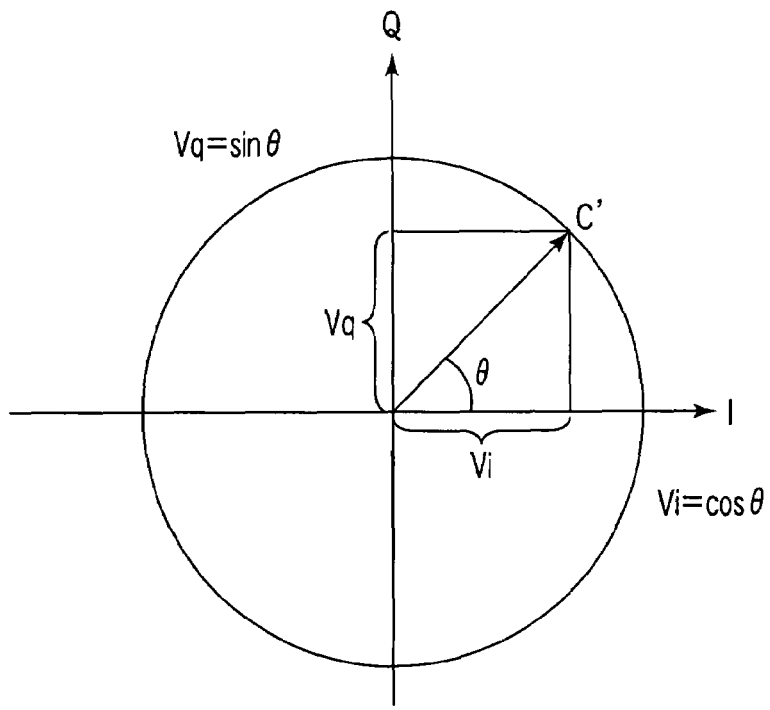
FIG. 11B is a vector diagram for use in describing an operation principle when the quadrature modulator is used to delay the signal as the phase controller apparatus according to the conventional art.

FIG. 10I is a block diagram showing the structure of an error detector 200' using the phase controller apparatus 20' according to the second embodiment as a sixth embodiment of the invention.

In FIG. 10I, the same reference numerals as those in FIGS. 10A and 10G are attached to the same components as the phase controller apparatus 20' according to the second embodiment and the error detector 200 according to the fifth embodiment and their description is omitted.

FIG. 10J is a block diagram showing the structure of an error detector 200' using the phase controller apparatus 20' according to the modification example of the second embodiment as a modification example of the sixth embodiment.

In FIG. 10J, the same reference numerals as those in FIGS. 10B and 10G are attached to the same components as the phase controller apparatus 20' according to the modification example of the second embodiment and the error detector 200 according to the fifth embodiment and their description is omitted.

As mentioned above, according to the invention, it is possible to solve the problems of the phase controller apparatus of the prior art and provide a phase controller apparatus which may give a desired delay to a signal to be phase-controlled, without effect of errors in the quadrature modulator, even when the frequency of the phase-controlled signal varies in a wide band, and a pulse pattern generator and an error detector using the phase controller apparatus.

The invention claimed is:

1. A phase controller apparatus comprising:
   a quadrature modulator which divides a first signal input as a local signal into an I channel signal and a Q channel signal orthogonal to each other and outputs a second signal having a desired phase delay relative to the first signal by giving direct current voltages to the I channel signal and the Q channel signal respectively;
   a phase comparison unit which detects a phase difference $\theta$ between the first signal input to the quadrature modulator and the second signal output from the quadrature modulator;
   a setting unit which sets the desired phase delay; and
   a controller section which controls the direct current voltages given to the I channel signal and the Q channel signal respectively in the quadrature modulator so that an output value corresponding to the phase difference $\theta$ detected by the phase comparison unit is equal to a value corresponding to the desired phase delay set by the setting unit and controls the direct current voltages to be Vi and Vq satisfying the relation of Vi=cos $\theta$ and Vq=sin $\theta$.

2. The phase controller apparatus according to claim 1, wherein the phase comparison unit has:
   a first frequency divider which divides the first signal by a predetermined dividing ratio M;
   a second frequency divider which divides the second signal by identical dividing ratio as that of the first frequency divider;
   a phase comparator which detects a phase difference between an output signal from the first frequency divider and an output signal from the second frequency divider; and
   a filter which extracts an output voltage of a direct current component from an output signal indicating the phase difference detected by the phase comparator, and
   the phase controller apparatus further comprises an analog/digital converter which converts the output voltage of the direct current component extracted by the filter into digital values and supplies the digital values to the controller section as an output value corresponding to the phase difference detected by the phase comparison unit.

3. The phase controller apparatus according to claim 2, wherein the controller section comprises:
   an initializing unit which sets the output voltage supplied from the phase comparison unit so as to change monotonously corresponding to a monotonous change of the phase difference $\theta$ of the second signal against the first signal within a predetermined range, thereby matching an internal condition of the first frequency divider with an internal condition of second frequency divider at a startup time;
   a calibration unit which obtains an initial output value Vp1 and a final output value Vp2 from the phase comparison unit by changing the direct current voltages Vi and Vq supplied to the I channel signal and the Q channel signal respectively in the quadrature modulator, thereby varying the phase difference $\theta$ between the first signal and the second signal by one period, after the setting by the initializing unit, and obtains a following formula representing a linear formula having constant gradient $$Vr=(Vp2-Vp1)\theta+(Vp1+Vp2)/2$$

(where, the unit of $\theta$ is UI),
   the formula indicating a relation between an output reference value Vr from the phase comparison unit giving the phase difference $\theta$ corresponding to the desired phase delay set by the setting unit and the initial value Vp1 and the final value Vp2, as a theoretical characteristic formula of the phase comparison unit; and
   a phase controlling unit which compares the output voltage from the phase comparison unit, which is obtained by giving the direct current voltages Vi and Vq involved in the phase difference $\theta$ corresponding to the desired phase delay set by the setting unit to the I channel signal and the Q channel signal respectively in the quadrature modulator, with the output reference value Vr obtained by the theoretical characteristic formula, as to the phase difference $\theta$ corresponding to the desired phase delay and controls the direct current voltages Vi and Vq given to the I channel signal and the Q channel signal respectively in the quadrature modulator so that the output voltage from the phase comparison unit is within the range of allowance set for the output reference value Vr, after the calibration unit obtains the theoretical characteristic formula.

4. The phase controller apparatus according to claim 2, wherein the predetermined dividing ratio M includes one of 16 and 32.

5. The phase controller apparatus according to claim 1, wherein the phase comparison unit includes an Exclusive-OR type (EX-OR) phase comparator.

6. The phase controller apparatus according to claim 1, wherein the quadrature modulator comprises:
   a 90-degree phase shifter which divides the first signal input as the local signal into the I channel signal and the Q channel signal orthogonal to each other;
   a first mixer and a second mixer which respectively give the direct current voltages Vi and Vq to the I channel signal and the Q channel signal output from the 90-degree phase shifter; and
   an adder which adds each of outputs from the first mixer and the second mixer and outputs a second signal having the desired phase delay according to the direct current voltages Vi and Vq.

7. The phase controller apparatus according to claim 6, wherein the controller section has
   a sin/cos table in which the predetermined direct current voltages Vi and Vq indicated by a sine value/cosine value corresponding to the desired phase delay arbitrarily set in a range of 0 to $\pi$ to $2\pi$ at predetermined intervals by the setting unit are stored as digital data, and
   the phase controller apparatus further has
   a digital/analog converter which converts the digital data of the predetermined direct current voltages Vi and Vq read out from the sin/cos table of the controller section into analog values and supplies the values to the first mixer and the second mixer, respectively.

8. The phase controller apparatus according to claim 6, wherein the controller section has
   a sin/cos operation unit which calculates the digital data of the predetermined direct current voltages Vi and Vq indicated by a sine value/cosine value corresponding to the desired phase delay arbitrarily set in a range of 0 to π to 2π at predetermined intervals by the setting unit, and the phase controller apparatus further has a digital/analog converter which converts the digital data of the predetermined direct current voltages calculated in the sin/cos operation unit of the controller section into analog values and supplies the analog values to the first mixer and the second mixer respectively.

9. The phase controller apparatus according to claim 1, further comprising:
a first filter block, when receiving a signal of rectangular wave as the first signal, which converts the first signal of rectangular wave into the first signal of sine wave and supplies the first signal to the quadrature modulator;
a second filter block which receives the second signal output from the quadrature modulator, eliminates spurious and direct current components from the second signal, and outputs a second signal of sine wave; and
a waveform shaper which converts the second signal of sine wave output from the second filter block into a second signal of rectangular wave and outputs the second signal of rectangular wave.

10. The phase controller apparatus according to claim 9, wherein each of filter members to be used as the first filter block and the second filter block selectively is set from among a plurality of low-pass filters and band-pass filters according to the frequency of the first signal by the controller section.

11. The phase controller apparatus according to claim 1, further comprising a filter block which, in the case of receiving a signal of sine wave as the first signal, receives the signal output from the quadrature modulator, eliminates spurious and direct current components, and outputs the second signal of sine wave.

12. The phase controller apparatus according to claim 11, wherein filter members to be used as the filter block selectively is set from among a plurality of low-pass filters and band-pass filters according to the frequency of the first signal by the controller section.

13. A pulse pattern generator comprising:
a pulse pattern generating unit which generates a desired pulse pattern signal;
a phase controller apparatus which controls a phase difference between the desired pulse pattern signal from the pulse pattern generating unit and a clock signal; and
a pulse pattern output unit which outputs the desired pulse pattern signal with a predetermined correction applied to the desired pulse pattern signal whose phase difference against the clock signal is controlled by the phase controller apparatus and after generated by the pulse pattern generating unit,
wherein the phase controller apparatus comprises:
a quadrature modulator which divides a first signal being the clock signal input as a local signal into an I channel signal and a Q channel signal orthogonal to each other and outputs a second signal having a desired phase delay relative to the first signal by giving direct current voltages to the I channel signal and the Q channel signal, respectively;
a phase comparison unit which detects a phase difference θ between the first signal and the second signal;
a setting unit which sets the desired phase delay; and
a controller section which controls the direct current voltages given to the I channel signal and the Q channel signal respectively in the quadrature modulator so that an output value corresponding to the phase difference θ detected by the phase comparison unit is equal to a value corresponding to the desired phase delay set by the setting unit, and controls the direct current voltages to be Vi and Vq satisfying the relation of Vi=cos θ and Vq=sin θ.

14. The pulse pattern generator according to claim 13, wherein the pulse pattern generating unit comprises:
a clock generating circuit which generates the clock signal;
a word pattern generating unit which generates a word pattern signal, based on the clock signal from the clock generating circuit;
a pseudo-random pattern generating unit which generates a pseudo-random pattern signal, based on the clock signal from the clock generating circuit; and
a switch which switches the word pattern signal from the word pattern generating unit and the pseudo-random pattern signal from the pseudo-random pattern generating unit to output as the desired pulse pattern signal.

15. The pulse pattern generator according to claim 14, wherein the pulse pattern output unit has:
a D-flip flop which, by receiving the desired pulse pattern signal from the switch at its data input end and also receiving the second signal having the desired phase delay corresponding to the predetermined direct current voltages against the first signal from the phase controller apparatus at its clock input end, outputs the desired pulse pattern signal whose phase difference against the clock signal supplied from the clock generating circuit is controlled by the phase controller apparatus that controls the phase difference against the clock signal supplied from the clock generating circuit; and
an output circuit which applies an amplitude correction and a direct current (DC) components correction to the desired pulse pattern signal phase difference-controlled and supplied from the D-flip flop to output as data output.

16. The pulse pattern generator according to claim 15, wherein the clock signal from the clock generating circuit is output to the outside as a clock output together with the data output.

17. The pulse pattern generator according to claim 13, wherein the phase comparison unit of the phase controller apparatus has:
a first frequency divider which divides the first signal by a predetermined dividing ratio M;
a second frequency divider which divides the second signal by identical dividing ratio as that of the first frequency divider;
a phase comparator which detects a phase difference between an output signal from the first frequency divider and an output signal from the second frequency divider; and
a filter which extracts an output voltage of a direct current component from an output signal indicating the phase difference detected by the phase comparator, and
the phase controller apparatus further comprises an analog/digital converter which converts the output voltage of the direct current component extracted by the filter into digital values and supplies the digital values to the controller section as an output value corresponding to the phase difference detected by the phase comparison unit.

18. The pulse pattern generator according to claim 14, wherein the controller section of the phase controller apparatus comprises:
an initializing unit which sets the output voltage Vp supplied from the phase comparison unit so as to change monotonously corresponding a monotonous change of the phase difference θ of the second signal against the first signal within a predetermined range, thereby matching an internal condition of the first frequency divider with an internal condition of the second frequency divider at a startup time;

a calibration unit which obtains an initial output value Vp1 and a final output value Vp2 from the phase comparison unit by changing the direct current voltages Vi and Vq supplied to the I channel signal and the Q channel signal respectively in the quadrature modulator, thereby varying the phase difference θ between the first signal and the second signal by one period, after the setting by the initializing unit, and obtains a following formula representing a linear formula having constant gradient $$Vr=(Vp2-Vp1)\theta+(Vp1+Vp2)/2$$

(where, the unit of θ is UI), the formula indicating a relation between an output reference value Vr from the phase comparison unit giving the phase difference θ corresponding to the desired phase delay set by the setting unit and the initial value Vp1 and the final value Vp2, as a theoretical characteristic formula of the phase comparison unit; and a phase controlling unit which compares the output voltage Vp from the phase comparison unit, which is obtained by giving the direct current voltages Vi and Vq involved in the phase difference θ corresponding to the desired phase delay set by the setting unit to the I channel signal and the Q channel signal respectively in the quadrature modulator, with the output reference value Vr obtained by the theoretical characteristic formula, as for the phase difference θ corresponding to the desired phase delay, and controls the direct current voltages Vi and Vq given to the I channel signal and the Q channel signal respectively in the quadrature modulator so that the output voltage Vp from the phase comparison unit is within the range of allowance set as for the output reference value Vr, after the calibration unit obtains the theoretical characteristic formula.

19. The pulse pattern generator according to claim 14, wherein the predetermined dividing ratio M includes one of 16 and 32.

20. The pulse pattern generator according to claim 13, wherein the phase comparison unit of the phase controller apparatus includes an Exclusive-OR type (EX-OR) phase comparator.

21. The pulse pattern generator according to claim 13, wherein the quadrature modulator of the phase controller apparatus comprises:

a 90-degree phase shifter which divides the first signal being the clock signal input as the local signal into the I channel signal and the Q channel signal orthogonal to each other;

a first mixer and a second mixer which respectively give the direct current voltages Vi and Vq to the I channel signal and the Q channel signal output from the 90-degree phase shifter; and an adder which adds each of outputs from the first mixer and the second mixer and outputs the second signal having the desired phase delay according to the direct current voltages Vi and Vq.

22. The pulse pattern generator according to claim 21, wherein the controller section of the phase controller apparatus has a sin/cos table in which the direct current voltages Vi and Vq indicated by a sine value/cosine value corresponding to the desired phase delay arbitrarily set in a range of 0 to π to 2π at predetermined intervals by the setting unit are stored as digital data, and the phase controller apparatus further has a digital/analog converter which converts the digital data of the direct current voltages Vi and Vq read out from the sin/cos table of the controller section into analog values and supplies the analog values to the first mixer and the second mixer, respectively.

23. The pulse pattern generator according to claim 21, wherein the controller section of the phase controller apparatus has a sin/cos operation unit which calculates the digital data of the direct current voltages Vi and Vq indicated by a sine value/cosine value corresponding to the desired phase delay arbitrarily set in a range of 0 to π to 2π at predetermined intervals by the setting unit, and the phase controller apparatus further has a digital/analog converter which converts the digital data of the predetermined direct current voltages Vi and Vq calculated in the sin/cos operation unit of the controller section into analog values and supplies the analog values to the first mixer and the second mixer, respectively.

24. The pulse pattern generator according to claim 13, wherein the phase controller apparatus further comprises:

a first filter block, when receiving a signal of rectangular wave as the first signal, which converts the first signal of rectangular wave into the first signal of sine wave and inputs the first signal to the quadrature modulator;

a second filter block which receives the second signal output from the quadrature modulator, eliminates spurious and direct current components from the second signal, and outputs a second signal of sine wave; and a waveform shaper which converts the second signal of sine wave output from the second filter block into the second signal of rectangular wave and outputs the second signal of rectangular wave.

25. The pulse pattern generator according to claim 24, wherein each of filter members to be used as the first filter block and the second filter block selectively is set from among a plurality of low-pass filters and band-pass filters according to the frequency of the first signal by the controller section.

26. The pulse pattern generator according to claim 13, wherein the phase controller apparatus further comprises a filter block which, in the case of receiving a signal of sine wave as the first signal, receives the signal output from the quadrature modulator, eliminates spurious and direct current components, and outputs the second signal of sine wave.

27. The pulse pattern generator according to claim 26, wherein filter members to be used as the filter block selectively is set from among a plurality of low-pass filters and band-pass filters according to the frequency of the first signal by the controller section.

28. An error detector comprising:

a phase controller apparatus which controls a phase of a clock signal input from outside;

a reference pattern generating circuit which generates a desired reference pattern signal based on the clock signal phase-controlled by the phase controller apparatus;

an Exclusive-OR circuit which compares a signal to be error-detected as a data input signal input from the outside with the desired reference pattern signal supplied from the reference pattern generating circuit by the unit of bit and outputs a bit error signal;

a synchronization control circuit which controls a phase of a synchronization signal for making an output timing of the desired reference pattern signal input from the reference pattern generating circuit based on the bit error signal supplied from the Exclusive-OR circuit and the clock signal phase-controlled by the phase controller apparatus agree with an input timing of the error-detected signal input from the outside by the unit of bit; and an error counting circuit which counts the bit error signal from the Exclusive-OR circuit and outputs the signal, wherein the phase controller apparatus comprises:

a quadrature modulator which divides a first signal being the clock signal input as a local signal into an I channel signal and a Q channel signal orthogonal to each other and outputs a second signal having a desired phase delay relative to the first signal by giving direct current voltages to the I channel signal and the Q channel signal, respectively;

a phase comparison unit which detects a phase difference $\theta$ between the first signal and the second signal;

a setting unit which sets the desired phase delay; and a controller section which controls the direct current voltages given to the I channel signal and the Q channel signal respectively in the quadrature modulator so that an output value corresponding to the phase difference detected by the phase comparison unit is equal to a value corresponding to the desired phase delay set by the setting unit, and controls the direct current voltages to be Vi and Vq satisfying the relation of Vi=cos $\theta$ and Vq=sin $\theta$.

29. The error detector according to claim 28, further comprising:

a clock generating circuit which reproduces a clock signal of rectangular wave included in the error-detected signal as a data input signal input from the outside and outputs the clock signal; and a switch which switches the clock signal supplied from the clock generating circuit and the clock signal input from the outside to output as the first signal being the clock signal input as a local signal to the phase controller apparatus.

30. The error detector according to claim 29, wherein the clock generating circuit uses the clock signal input from the outside when it is difficult to reproduce the clock signal of rectangular wave included in the error-detected signal as the data input signal.

31. The error detector according to claim 28, wherein the reference pattern generating circuit has:

a word pattern generating unit which generates a word pattern signal based on the clock signal;

a pseudo-random pattern generating unit which generates a pseudo-random pattern signal based on the clock signal; and a switch which switches the word pattern signal from the word pattern generating unit and the pseudo-random pattern signal from the pseudo-random pattern generating unit to output as the desired pulse pattern signal.

32. The error detector according to claim 28, wherein the phase comparison unit of the phase controller apparatus has:

a first frequency divider which divides the first signal by a predetermined dividing ratio M;

a second frequency divider which divides the second signal by identical dividing ratio as that of the first frequency divider;

a phase comparator which detects a phase difference $\theta$ between an output signal from the first frequency divider and an output signal from the second frequency divider; and a filter which extracts an output voltage Vp of direct current components from an output signal indicating the phase difference $\theta$ detected by the phase comparator, and the phase controller apparatus further comprises an analog/digital converter which converts the output voltage Vp of the direct current component extracted by the filter into digital values and supplies the digital values to the controller section as an output value corresponding to the phase difference detected by the phase comparison unit.

33. The error detector according to claim 29, wherein the controller section of the phase controller apparatus comprises:

an initializing unit which sets the output voltage Vp supplied from the phase comparison unit so as to change monotonously corresponding to a monotonous change of the phase difference $\theta$ of the second signal against the first signal within a predetermined range, thereby matching an internal condition of the first frequency divider with an internal condition of the second frequency divider at a startup time;

a calibration unit which obtains an initial output value Vp1 and a final output value Vp2 from the phase comparison unit by changing the direct current voltages Vi and Vq supplied to the I channel signal and the Q channel signal respectively in the quadrature modulator, thereby varying the phase difference $\theta$ between the first signal and the second signal by one period, after the setting by the initializing unit, and obtains a following formula representing a linear formula having constant gradient $$Vr=(Vp2-Vp1)\theta+(Vp1+Vp2)/2$$

(where, the unit of $\theta$ is UI), the formula indicating a relation between an output reference value Vr from the phase comparison unit giving the phase difference $\theta$ corresponding to the desired phase delay set by the setting unit and the initial value Vp1 and the final value Vp2, as a theoretical characteristic formula of the phase comparison unit; and a phase controlling unit which compares the output voltage Vp from the phase comparison unit, which is obtained by giving the direct current voltages Vi and Vq involved in the phase difference $\theta$ corresponding to the desired phase delay set by the setting unit to the I channel signal and the Q channel signal respectively in the quadrature modulator, with the output reference value Vr obtained by the theoretical characteristic formula, as for the phase difference $\theta$ corresponding to the desired phase delay and controls the direct current voltages Vi and Vq given to the I channel signal and the Q channel signal respectively in the quadrature modulator so that the output voltage Vp from the phase comparison unit is within the range of allowance set as for the output reference value Vr, after the calibration unit obtains the theoretical characteristic formula.

34. The error detector according to claim 29, wherein the predetermined dividing ratio M includes one of 16 and 32.

35. The error detector according to claim 28, wherein the phase comparison unit of the phase controller apparatus includes an Exclusive-OR type (EX-OR) phase comparator.

36. The error detector according to claim 28, wherein the quadrature modulator of the phase controller apparatus comprises:

a 90-degree phase shifter which divides the first signal being the clock signal input as the local signal into the I channel signal and the Q channel signal orthogonal to each other;

a first mixer and a second mixer which respectively give the direct current voltages Vi and Vq to the I channel signal and the Q channel signal output from the 90-degree phase shifter; and an adder which adds each of outputs from the first mixer and the second mixer and outputs a second signal having the desired phase delay according to the direct current voltages Vi and Vq.

37. The error detector according to claim 36, wherein the controller section of the phase controller apparatus has a sin/cos table in which the direct current voltages Vi and Vq indicated by a sine value/cosine value corresponding to the desired phase delay arbitrarily set in a range of 0 to $\pi$ to $2\pi$ at predetermined intervals by the setting unit are stored as digital data, and the phase controller apparatus further has a digital/analog converter which converts the digital data of the direct current voltages Vi and Vq read out from the sin/cos table of the controller section into analog values and supplies the analog values to the first mixer and the second mixer, respectively.

38. The error detector according to claim 36, wherein the controller section of the phase controller apparatus has a sin/cos operation unit which calculates the digital data of the direct current voltages Vi and Vq indicated by a sine value/cosine value corresponding to the desired phase delay arbitrarily set in a range of 0 to $\pi$ to $2\pi$ at predetermined intervals by the setting unit, and the phase controller apparatus further has a digital/analog converter which converts the digital data of the direct current voltages Vi and Vq calculated in the sin/cos operation unit of the controller section into analog values and supplies the analog values to the first mixer and the second mixer, respectively.

39. The error detector according to claim 28, wherein the phase controller apparatus further comprises:

a first filter block, when receiving a signal of rectangular wave as the first signal which converts the first signal of rectangular wave into the first signal of sine wave and inputs the first signal to the quadrature modulator;

a second filter block which receives the second signal output from the quadrature modulator, eliminates spurious and direct current components from the second signal, and outputs a second signal of sine wave; and a waveform shaper which converts the second signal of sine wave output from the second filter block into the second signal of rectangular wave and outputs the second signal of rectangular wave.

40. The error detector according to claim 39, wherein each of filter members to be used as the first filter block and the second filter block selectively is set from among a plurality of low-pass filters and band-pass filters according to the frequency of the first signal by the controller section.

41. The error detector according to claim 28, wherein the phase controller apparatus further comprises a filter block which, in the case of receiving a signal of sine wave as the first signal, receives the signal output from the quadrature modulator, eliminates spurious and direct current components from the signal, and outputs the second signal of sine wave.

42. The error detector according to claim 41, wherein filter members to be used as the filter block selectively is set from among the plurality of low-pass filters and band-pass filters according to the frequency of the first signal by the controller section.

* * * * *